United States Patent
Miyatake

(10) Patent No.: US 7,245,410 B2
(45) Date of Patent: Jul. 17, 2007

(54) OPTICAL SCANNING DEVICE AND IMAGE FORMING APPARATUS

(75) Inventor: Naoki Miyatake, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/609,711

(22) Filed: Dec. 12, 2006

(65) Prior Publication Data

US 2007/0081216 A1    Apr. 12, 2007

Related U.S. Application Data

(62) Division of application No. 11/411,072, filed on Apr. 26, 2006, now Pat. No. 7,161,724.

(30) Foreign Application Priority Data

Jun. 28, 2005    (JP)    ............................. 2005-188907

(51) Int. Cl.
G02B 26/08    (2006.01)
(52) U.S. Cl. ...................... 359/204; 347/243
(58) Field of Classification Search ................ 359/204, 359/216; 347/241, 243, 244
See application file for complete search history.

(56) References Cited

U.S. PATENT DOCUMENTS

| | | | |
|---|---|---|---|
| 6,734,890 B2 | 5/2004 | Takeuchi et al. | |
| 6,873,466 B2 * | 3/2005 | Hama et al. | ................. 359/216 |
| 6,987,593 B2 | 1/2006 | Hayashi et al. | |
| 2004/0184127 A1 | 9/2004 | Nakajima et al. | |
| 2005/0225819 A1 | 10/2005 | Atsuumi et al. | |

FOREIGN PATENT DOCUMENTS

| | | |
|---|---|---|
| JP | 11-14932 | 1/1999 |
| JP | 11-38348 | 2/1999 |
| JP | 2001-4948 | 1/2001 |
| JP | 2001-10107 | 1/2001 |
| JP | 3295281 | 4/2002 |
| JP | 2003-5114 | 1/2003 |
| JP | 3450653 | 7/2003 |
| JP | 2004-70109 | 3/2004 |

* cited by examiner

*Primary Examiner*—Euncha P. Cherry
(74) *Attorney, Agent, or Firm*—Oblon, Spivak, McClelland, Maier & Neustadt, P.C.

(57) ABSTRACT

An even number of reflection mirrors reflecting a light beam in the sub-scanning direction are disposed on an optical path from a deflecting reflection surface of an optical deflector to a corresponding surface to be scanned, for a light beam that is incident on the deflecting reflection surface from one side of a line normal to the deflecting reflection surface in the sub-scanning direction. An odd number of reflection mirrors reflecting the light beam in the sub-scanning direction is disposed on the optical path, for a light beam that is incident on the deflecting reflection surface from the other side of the line normal to the deflecting reflection surface in the sub-scanning direction.

8 Claims, 14 Drawing Sheets

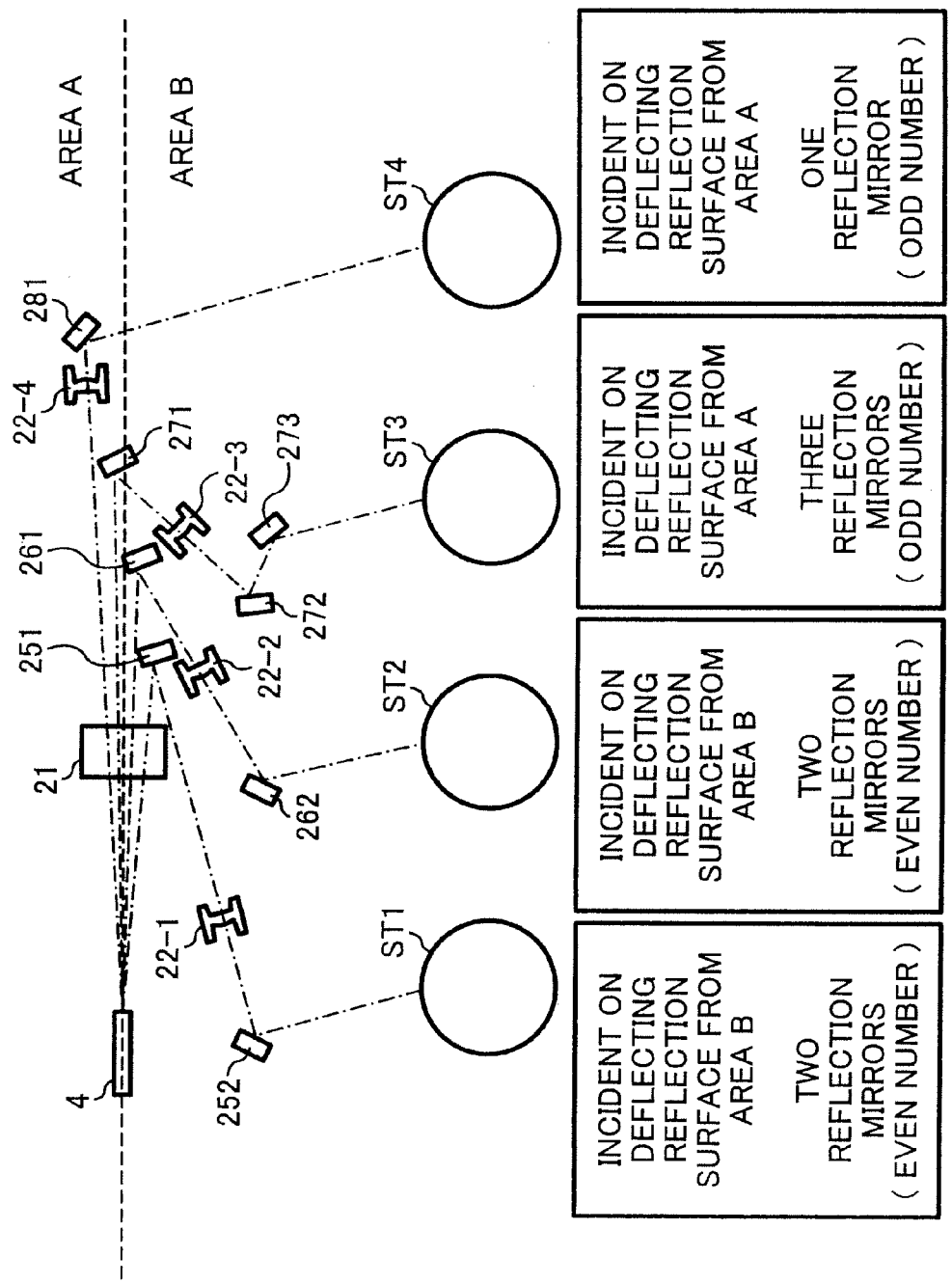

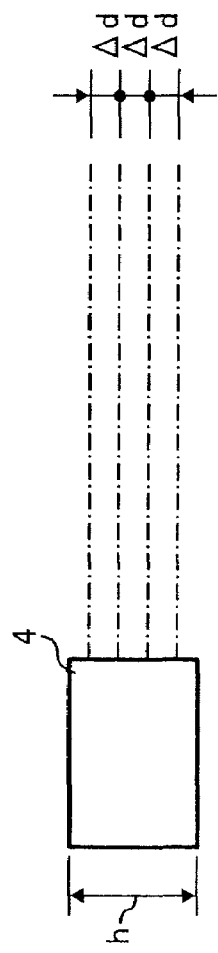

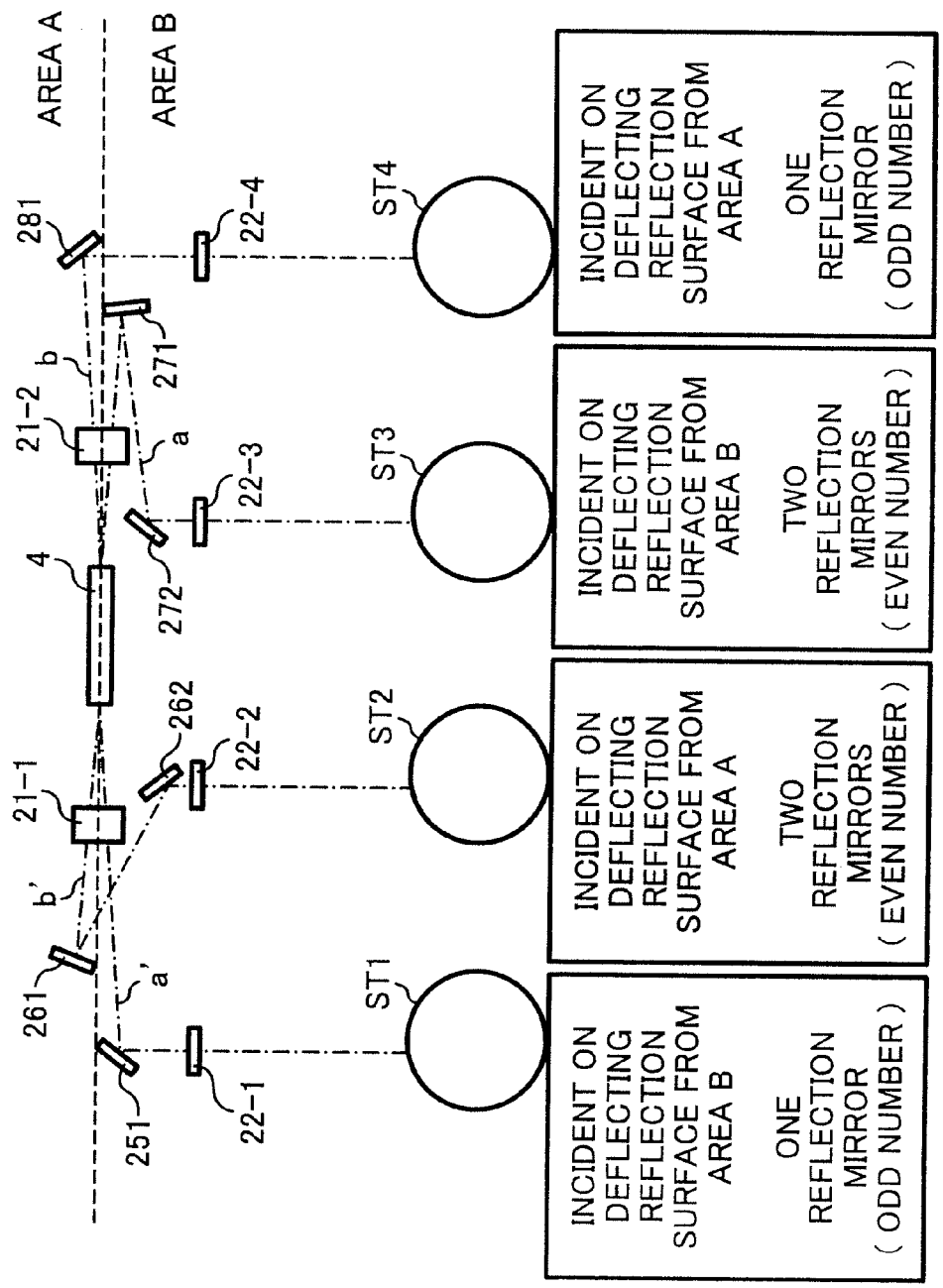

OPTICAL SCANNING DEVICE AND IMAGE FORMING APPARATUS

CROSS-REFERENCE TO RELATED APPLICATIONS

This application is a Divisional of and claims the benefit of priority under 35 USC §120 from U.S. Ser. No. 11/411,072, filed Apr. 26, 2006 now U.S. Pat. No. 7,161,724, and claims the benefit of priority under 35 U.S.C. §119 from Japanese priority document, 2005-188907 filed in Japan on Jun. 28, 2005, the entire contents of each of which are incorporated by reference herein.

BACKGROUND OF THE INVENTION

1. Field of the Invention

The present invention relates to an optical scanning device and an image forming apparatus employing the optical scanning device, such as a digital copying machine, a laser printer, and a laser facsimile.

2. Description of the Related Art

Generally speaking, in optical scanning devices that are popularly used in image forming apparatuses such as laser printers to which an electronic photograph process is applied, a light beam emitted from the light source side is deflected by an optical deflector, and the deflected light beam is converged onto a scanning surface by a scanning and imaging forming optical system like an Fθ lens, so that a beam spot is formed on the scanning surface, and the scanning surface is optically scanned by the beam spot (this scanning process is called "main scanning"). The actual substance of the scanning surface is a photosensitive surface of a photosensitive medium that includes a photosensitive member having photoconductivity.

As an example of full-color image forming apparatuses, a "tandem-type image forming apparatus" is publicly known in which four photosensitive members are arranged along the conveyance direction of a recording paper, and an image is formed by deflecting and scanning, using a single deflecting device, a light flux of light beams that are emitted from a plurality of light source devices and correspond to these photosensitive members. In such a "tandem-type image forming apparatus", latent images are formed through a simultaneous exposure process with image signals for color components corresponding to the photosensitive members, using a plurality of scanning and image forming optical systems respectively corresponding to the photosensitive members. The latent images are then made into visible images by developing devices that use developers in mutually different colors, namely in yellow, magenta, cyan, and black, for example. Subsequently, the visible images are sequentially transferred and fixed onto a same sheet of recording paper on top of one another, so that a color image is obtained. Of tandem-type image forming apparatuses in which two or more sets of an optical scanning device and a photosensitive member are used in combination so as to form two-color images, multi-color images, and color images, in some tandem-type image forming apparatuses that are publicly known, a single optical deflector is used in common among a plurality of photosensitive media, as described below.

(1) A plurality of light fluxes that are substantially parallel to one another and are apart from one another in a sub-scanning direction are made incident to an optical deflector. A plurality of scanning optical devices that correspond to the light fluxes are arranged in the sub-scanning direction so that a scanning process is performed (see, for example, Japanese Patent Application Laid-Open No. H9-54263).

(2) Light fluxes are made incident to an optical deflector from one side of the optical deflector. A scanning optical system includes three lenses. A plurality of light fluxes that travel toward mutually different scanning surfaces pass through a first lens L1 and a second lens L2. A third lens L3 is provided for each of the light fluxes that travel toward the mutually different scan surfaces (see, for example, Japanese Patent Application Laid-Open No. 2001-4948, Japanese Patent Application Laid-Open No. 2001-10107, and Japanese Patent Application Laid-Open No. 2001-33720).

By using a single optical deflector in common for a plurality of scanning surfaces, it is possible to reduce the number of optical deflectors and to make the image forming apparatus compact. However, for optical scanning devices to be included in a image forming apparatus for full-color images having scanning surfaces (photosensitive members) that respectively correspond to four colors, namely for example, cyan, magenta, yellow, and black, even if it is possible to reduce the number of optical deflectors, a problem still remains where the size of the optical deflector, namely, for example, a polygon mirror, needs to be large in the sub-scanning direction because of the arrangement in which the light beams traveling toward the photo sensitive members are made incident to the optical deflector while they are arranged in a row in the sub-scanning direction, being substantially parallel to one another. Generally speaking, the cost of the polygon mirror portion among optical elements included in an optical scanning device is high. In an endeavor to reduce the costs and the size of an optical scanning device as a whole, a large polygon mirror creates a problem.

Recently, one of the systems that are publicly known for reducing the costs by using a single optical deflector in an optical scanning device included in a color image forming apparatus is an oblique incident optical system with which a light beam is made incident to the deflecting reflection surface of the optical deflector at an angle in the sub-scanning direction (see, for example, Japanese Patent Application Laid-Open No. 2003-5114). In the oblique incident optical system, after being deflected and reflected on the deflecting reflection surface, each of a plurality of light beams that have been separated by a reflection mirror or the like is introduced to a corresponding one of scanning surfaces (photosensitive members). When the light beams are separated, the angle, in the secondary direction, of each of the light beams (i.e. the angle at which each of the light beams is obliquely incident to the optical deflector) is set at such an angle that the light fluxes can be separated by the reflection mirror. When this type of oblique incident optical system is used, it is possible to avoid using a large optical deflector, in other words, it is possible to avoid using a polygon mirror having too many layers or being too thick in the sub-scanning direction, while having an arrangement in which the light fluxes can be separated by the mirror, and also the distance between the light beams that are positioned adjacent to one another in the sub-scanning direction is kept small.

When a polygon mirror is used as an optical deflector, it is difficult, with a normal incident method, to make the light fluxes emitted from the light source side incident toward the rotation axis of the polygon mirror. It is not impossible to make the light fluxes incident toward the rotation axis of the polygon mirror; however, assuring a sufficient deflection angle requires that each of the deflecting reflection surfaces becomes extremely large and makes it impossible to keep the size of the polygon mirror small. When the size of the polygon mirror is large, the degree of occurrence of what is called "sags" becomes large, too. The sags occur asymmetrically for an image height 0. When the size of the polygon mirror is large, a lot of energy is required for a high-speed rotation of the polygon mirror, and a noise preventing means needs to be large, too, because the "whistling noise" during the high-speed rotation is also loud.

To the contrary, when an oblique incident method is used, because it is possible to make the light flux from the light source side incident toward the rotation axis of the polygon mirror, it is possible to make the diameter of the polygon mirror small. The "whistling noise" during a high-speed rotation is also small. Accordingly, the oblique incident method is suitable for achieving a high speed. Because it is possible to make the diameter of the polygon mirror small, the degree of occurrence of sags is small, too. Also, because it is possible to make sags occur symmetrically for an image height: 0, it is also easy to correct the sags.

However, the oblique incident method has the problem of having a large "bending of a scanning line". The amount of occurrence of the bending of scanning line varies depending on the oblique incident angle, in the sub-scanning direction, of each of the light beams. When latent images that have been drawn by the light beams are made visible with toners for different colors and are overlapped on top of one another, the images will exhibit a color registration error. Also, when the oblique incident method is used, because the light flux is incident while being distorted with respect to a scanning lens, the wave aberration increases, and the level of optical performance is significantly degraded especially for the periphery image height. Thus, the beam spot diameter for the periphery image height becomes large, and it could be one of the causes that hinder the endeavor to make high quality images.

Some methods have been proposed to correct a "large bending of a scanning line", which is a problem unique to the oblique incident method. As an example, "a lens that has a lens surface of which the unique inclination in the sub-scanning cross-sectioned plane is altered toward the main-scanning direction so that the bending of the scanning line is corrected" is added to a scanning and image forming optical system (see, for example, Japanese Patent Application Laid-Open No. H11-14932). As another example, "a correcting reflection surface that has a reflection surface of which the unique inclination in the sub-scanning cross-sectioned plane is altered toward the main-scanning direction so that the bending of the scanning line is corrected" is added to a scanning and image forming optical system (see, for example, Japanese Patent Application Laid-Open No. H11-38348).

Another method that has been proposed is to let a light flux being obliquely incident to an optical deflector pass on the outside of the axis of a scanning lens, and to bring the positions of the scanning lines in alignment by using a surface by which the amount of asphericity of the non-generatrix (radius curvature of a sub-scanning) of the scanning lens changes along the main-scanning direction (see, for example, Japanese Patent Application Laid-Open No. 2004-70109). This publication discloses an example in which a correction process is performed by one scanning lens. With this arrangement, it is possible to correct the bending of the scanning line; however, the publication does not mention degradation of a beam spot diameter due to an increase in the wave aberration.

Another problem related to the oblique incident method is that the wave aberration is easily degraded by a large amount for the periphery image height (near both ends of a scanning line) due to a light beam skew. When a wave aberration occurs, the spot diameter of a beam spot for the periphery image height becomes large. Unless this problem is solved, it is not possible to achieve "a high-density optical scanning", which is strongly demand these days. The optical scanning device disclosed in the Japanese Unexamined Patent Application Publication No. 2004-70109 is able to correct extremely well a large bending of scanning line, which is a problem unique to the oblique incident method, but is not able to correct the wave aberration in a sufficient manner.

Another optical scanning device has been proposed to properly correct "the bending of the scanning line and degradation of the wave aberration", which are the problems related to the oblique incident method. In this proposed apparatus, the scanning and image forming optical system includes a plurality of rotating asymmetric lenses, and the shape of a generatrix that connects the vertices of the non-generatrix on the lens surface in the sub-scanning direction, is configured to be curved in the sub-scanning direction (see, for example, Japanese Patent Application Laid-Open No. H10-73778).

However, as for the lens having the "lens surface on which the shape of the generatrix is configured to be curved in the sub-scanning direction", the problems are solved by having the generatrix curved. Thus, it is necessary to have individual scanning lenses each of which corresponds to a different one of incident light fluxes. Consequently, when the optical scanning device is used as a tandem scanning optical system, the number of scanning lenses to be used becomes large.

When a plurality of light fluxes that travel toward mutually different scanning surfaces are made incident to a single lens, with the arrangement in which the shape of the generatrix is curved, it is possible to solve various problems for a light flux on one side, but it is difficult to reduce the bendings of the scanning lines and the wave aberration for a light flux on the other side.

Also, because the lens has a bending in the sub-scanning direction, when the light flux being incident to the lens is shifted in the sub-scanning direction, the shape of the bending of the scanning line is changed because of a refracting power of the lens in the sub-scanning direction, due to the influence of assembly errors, process errors, environment variation, or the like. Thus, it is not possible to achieve the effect of inhibiting color registration errors in color images, the effects being expected at the initial stage (or at the designing stage), and the problem of a color registration error arises.

Further, in the process of correcting the wave aberration, on a surface having a bending, the degree of the light flux skew largely varies due to instability of the incident light flux. Consequently, it is difficult to achieve a good beam spot diameter constantly.

According to the invention disclosed in Japanese Patent Application Laid-Open No. 2003-5114 that uses the oblique incident method, a bending of a scanning line is corrected using the same type of surface according to the invention disclosed in Japanese Patent Application Laid-Open No. H10-73778; however, as described above, it is difficult to achieve a good beam spot diameter constantly with this arrangement.

In addition, when an oblique incident optical system is used, a bending of a scanning line is observed when there is a change in the temperature. Because a light beam is incident to a scanning lens while being curved in the sub-scanning direction, the change in the temperature causes a change in the bending radius of the scanning lens, a change in the thickness of the scanning lens, or a change in the incident height of the light beam being incident to the scanning lens; therefore, the degree of the bending in the scanning is large. When a scanning optical system according to a conventional technology is used, a light beam is incident to a scanning lens substantially horizontally with respect to the optical axis without being curved, there is no bending of the scanning line, or if any, the degree of the bending of the scanning line is extremely small. Accordingly, the problem of bendings of scanning lines is a problem unique to oblique incident optical systems.

The inventions disclosed in the above literatures aim to make the degree of bendings of scanning lines small but do not solve the problem of bendings of scanning lines caused by a change in the temperature.

SUMMARY OF THE INVENTION

It is an object of the present invention to at least solve the problems in the conventional technology.

An optical scanning device according to one aspect of the present invention includes a light source unit that emits a plurality of light beams; an optical deflector that deflects the light beams from the light source unit; and a scanning optical system that focuses the deflected light beams on different surfaces to be scanned, respectively. Each of the light beams is incident on a deflecting reflection surface of the optical deflector obliquely in a sub-scanning direction with respect to a line normal to the deflecting reflection surface. Light beams that are deflected at same deflecting reflection surface of the optical deflector are incident on the scanning optical system from both sides with respect to the line normal to the deflecting reflection surface in the sub-scanning direction. Even number of reflection mirrors reflecting the light beam in the sub-scanning direction is disposed on an optical path from the deflecting reflection surface to a corresponding surface to be scanned, for a light beam that is incident on the deflecting reflection surface from one side of the line normal to the deflecting reflection surface in the sub-scanning direction. Odd number of reflection mirrors reflecting the light beam in the sub-scanning direction is disposed on an optical path from the deflecting reflection surface to a corresponding surface to be scanned, for a light beam that is incident on the deflecting reflection surface from other side of the line normal to the deflecting reflection surface in the sub-scanning direction.

An image forming apparatus that forms an image by executing an electronic photographing process, according to another aspect of the present invention, includes an optical scanning device including a light source unit that emits a plurality of light beams; an optical deflector that deflects the light beams from the light source unit; and a scanning optical system that focuses the deflected light beams on different surfaces to be scanned, respectively. Each of the light beams is incident on a deflecting reflection surface of the optical deflector obliquely in a sub-scanning direction with respect to a line normal to the deflecting reflection surface. Light beams that are deflected at same deflecting reflection surface of the optical deflector are incident on the scanning optical system from both sides with respect to the line normal to the deflecting reflection surface in the sub-scanning direction. Even number of reflection mirrors reflecting the light beam in the sub-scanning direction is disposed on an optical path from the deflecting reflection surface to a corresponding surface to be scanned, for a light beam that is incident on the deflecting reflection surface from one side of the line normal to the deflecting reflection surface in the sub-scanning direction. Odd number of reflection mirrors reflecting the light beam in the sub-scanning direction is disposed on an optical path from the deflecting reflection surface to a corresponding surface to be scanned, for a light beam that is incident on the deflecting reflection surface from other side of the line normal to the deflecting reflection surface in the sub-scanning direction.

A color image forming apparatus according to still another aspect of the present invention includes an optical scanning device including a light source unit that emits a plurality of light beams; an optical deflector that deflects the light beams from the light source unit; and a scanning optical system that focuses the deflected light beams on different surfaces to be scanned, respectively. Each of the light beams is incident on a deflecting reflection surface of the optical deflector obliquely in a sub-scanning direction with respect to a line normal to the deflecting reflection surface. Light beams that are deflected at same deflecting reflection surface of the optical deflector are incident on the scanning optical system from both sides with respect to the line normal to the deflecting reflection surface in the sub-scanning direction. Even number of reflection mirrors reflecting the light beam in the sub-scanning direction is disposed on an optical path from the deflecting reflection surface to a corresponding surface to be scanned, for a light beam that is incident on the deflecting reflection surface from one side of the line normal to the deflecting reflection surface in the sub-scanning direction. Odd number of reflection mirrors reflecting the light beam in the sub-scanning direction is disposed on an optical path from the deflecting reflection surface to a corresponding surface to be scanned, for a light beam that is incident on the deflecting reflection surface from other side of the line normal to the deflecting reflection surface in the sub-scanning direction. The surfaces to be scanned include at least surfaces of four photosensitive members of different colors.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a side view of the optical scanning device according to the first embodiment, being viewed from a direction corresponding to a sub-scanning direction;

FIG. 3A is a side view of an optical deflector with a parallel light incident according to a conventional technology;

FIG. 3B is a side view of the optical deflector with an oblique light incident according to the first embodiment;

FIG. 5A is a conceptual drawing of an example in which the generatrix of the scanning lens is curved; and FIG. 5B is a conceptual drawing of an example in which the generatrix of the scanning lens is straight;

FIG. 6A is a perspective view for showing the overall structure; and FIG. 6B is a perspective view for showing the portion from a light source unit to a first scanning lens;

FIG. 7A is a conceptual drawing for showing a configuration with two layers of mirrors; and FIG. 7B is a conceptual drawing for showing a configuration with one layer of mirror;

FIG. 8 is a schematic side view for showing another embodiment of the optical scanning device according to the present invention;

FIG. 9A is a side view; and FIG. 9B is a plan view for showing bendings of scanning lines on scanning surfaces;

FIG. 10A is a side view; and FIG. 10B is a plan view for showing bendings of scanning lines on scanning surfaces;

DETAILED DESCRIPTION OF THE PREFERRED EMBODIMENTS

Exemplary embodiments of the present invention will be explained in detail below with reference to the accompanying drawings.

Figure 1:
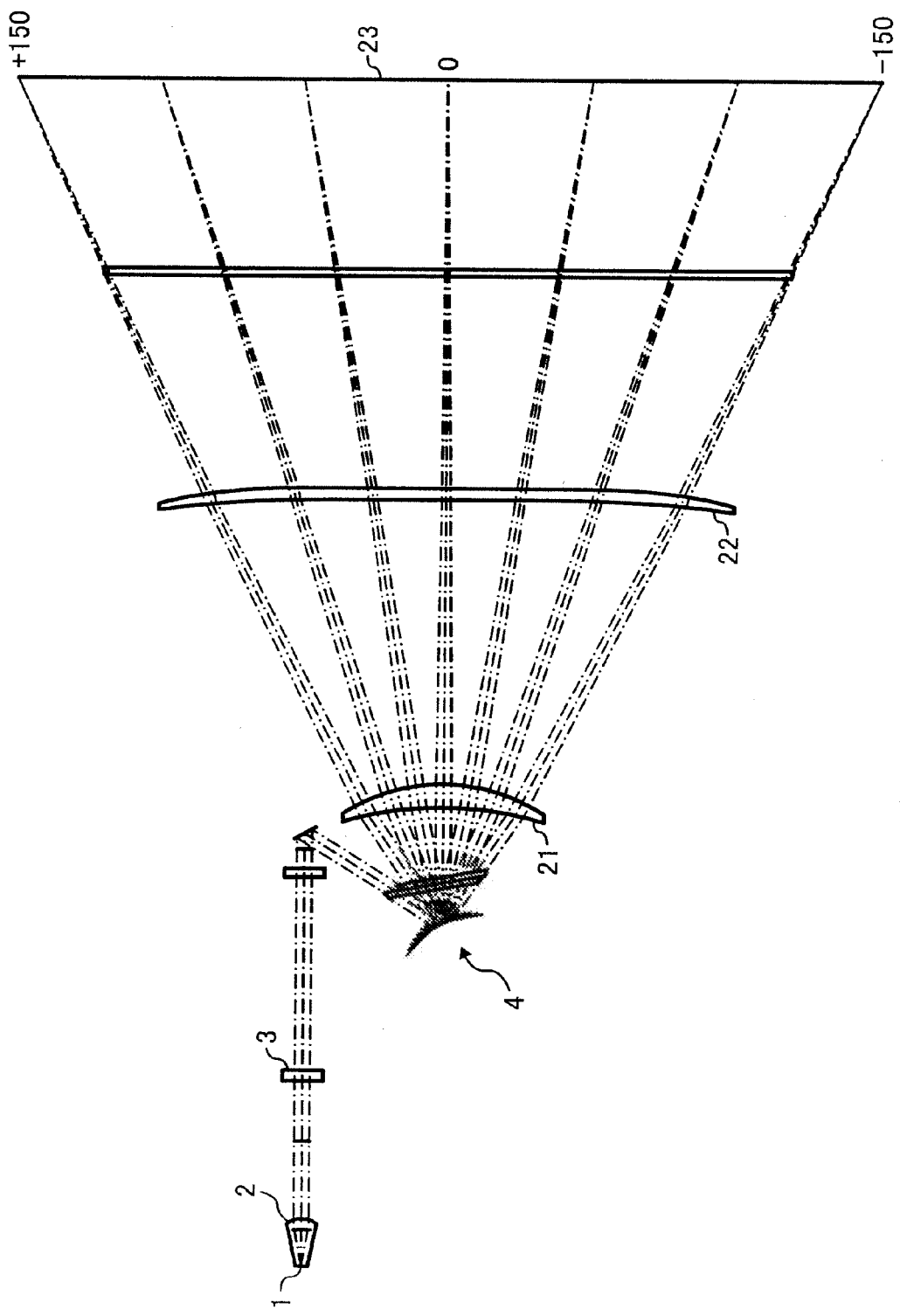
FIG. 1 is a plan view of an optical scanning device according to a first embodiment of the present invention, being viewed from a direction corresponding to a main-scanning direction.

FIG. 1 is a plan view of an embodiment of an optical scanning device according to a first embodiment of the present invention, being viewed from a direction corresponding to a main-scanning direction. FIG. 2 is a side view of the optical scanning device according to the first embodiment, being viewed from a direction corresponding to a sub-scanning direction. In FIGS. 1 and 2, a divergent light flux emitted from a light source device 1 including a semiconductor laser is transformed, by a coupling lens 2, into a light flux in a form that is suitable for the optical systems used in the later processes. The form of light flux resulting from the transformation by the coupling lens 2 may be a parallel light flux, a slightly divergent light flux, or a slightly convergent light flux. The light flux having passed through the coupling lens 2 is converged into only the sub-scanning direction by a cylindrical lens 3 and becomes incident to the deflecting reflection surface of an optical deflector 4 including a polygon mirror that is driven to rotate at a high and constant speed by a motor.

As shown in FIG. 2, the light flux emitted from the light source device 1 side is incident at an angle with respect to a plane orthogonal to the rotation axis of the deflecting reflection surface of the polygon mirror. Accordingly, the light flux reflected by the deflecting reflection surface is also at angle with respect to the plane. It is possible to make a light beam obliquely incident, at an angle, with respect to a plane being orthogonal to the rotation axis of the polygon mirror, by arranging the light source device 1, the coupling lens 2, and the cylindrical lens 3 to be at angles, or by disposing a reflection mirror between the cylindrical lens 3 and the optical deflector 4 and arranging the reflection mirror to be at an angle. Alternatively, it is also acceptable to arrange a light beam traveling toward the deflecting reflection surface to be at an angle by shifting the optical axis of the cylindrical lens 3 to the sub-scanning direction. The light flux reflected by the deflecting reflection surface is deflected with a constant angular velocity due to the constant speed rotation of the polygon mirror, passes through a first scanning lens 21 and a second scanning lens 22 that are included in a scanning optical system, and is then converged on one of scanning surfaces 23. Consequently, the deflected light flux forms a beam spot on the one of the scanning surfaces 23 and optically scans the scanning surface.

The optical scanning device according to the present invention has an arrangement in which the light flux emitted from the light source side is obliquely incident, in the sub-scanning direction, with respect to a line normal to the deflecting reflection surface of the optical deflector 4. The example shown in FIG. 2 is configured as an optical scanning device using a one-side scanning method. In FIG. 2, light beams emitted from a plurality of light source devices (not shown) are obliquely incident to a same deflecting reflection surface of a same optical deflector, which is the optical deflector 4. The light beams are incident from the both sides (from the area A and from the area B shown in the drawing), in the sub-scanning direction, of the line normal to the deflecting reflection surface (the line being shown as a horizontal dotted line in FIG. 2). After all the light beams pass through the first scanning lens 21 that is used in common, the light beams are separated by reflection mirrors reflecting toward the sub-scanning direction so as to be introduced to a corresponding one of the scanning surfaces 23, namely, a corresponding one of photosensitive members ST1, ST2, ST3, and ST4. In the first embodiment, the scanning optical system includes two types of lenses, namely, the first scanning lens 21 and second scanning lenses. One second scanning lens is disposed for each light beam that travels toward a corresponding one of the scanning surfaces 23. The reference numerals 22-1 to 22-4 denote the second scanning lenses. The second scanning lens 22-1 corresponds to the photosensitive member ST1 serving as a scanning surface. The second scanning lens 22-2 corresponds to the photosensitive member ST2 serving as another scanning surface. The second scanning lens 22-3 corresponds to the photosensitive member ST3 serving as another scanning surface. The second scanning lens 22-4 corresponds to the photosensitive member ST4 serving as another scanning surface.

An odd number of reflection mirrors are used to correspond to light beams being incident from the area on one side, in the sub-scanning direction, of the line normal to the deflecting reflection surface of the optical deflector 4, for example, from the area A shown on the lower side of FIG. 2. An even number of reflection mirrors is used to correspond to light beams being incident from the area on the other side, for example, from the area B shown on the upper side of FIG. 2. It should be noted that the light beams shown in FIG. 2 are light beams after being deflected and reflected by the optical deflector 4; therefore, the light beams incident to the deflecting reflection surface of the optical deflector 4 are the light beams that are incident from the area opposite, in the sub-scanning direction, to the light beams shown in FIG. 2. To explain this more specifically, the light flux that is reflected by the deflecting reflection surface from the area B side and is introduced to the photosensitive member ST1 passes through the first scanning lens 21, a reflection mirror 251, the second scanning lens 22-1, and a reflection mirror 252, before reaching the photosensitive member ST1. Thus, the number of mirrors is an even number. The light flux that is reflected by the deflecting reflection surface from the area B side and is introduced to the photosensitive member ST2 passes through the first scanning lens 21, a reflection mirror 261, the second scanning lens 22-2, and a reflection mirror 262, before reaching the photosensitive member ST2. Thus, the number of mirrors is an even number. The light flux that is reflected by the deflecting reflection surface from the area A side and is introduced to the photosensitive member ST3 passes through the first scanning lens 21, a reflection mirror 271, the second scanning lens 22-3, a reflection mirror 272, and a reflection mirror 273 before reaching the photosensitive member ST3. Thus, the number of mirrors is an odd number. The light flux that is reflected by the deflecting reflection surface from the area A side and is introduced to the photosensitive member ST4 passes through the first scanning lens 21, the second scanning lens 22-4, and a reflection mirror 281, before reaching the photosensitive member ST4. Thus, the number of mirrors is an odd number.

With an optical scanning device according to a conventional technology in which a one-side scanning method with no oblique incidents is used so that all the light beams are incident horizontally with respect to the line normal to the deflecting reflection surface of the polygon mirror, it is easy to achieve a high level of optical performance as shown in FIG. 3A. However, the light beams emitted from the light source device, in other words, the light beams introduced to mutually different scanning surfaces, need to have a sufficient distance between one another (Δd in FIGS. 3A and 3B.) so that they can be separated from one another. The distance is normally 3 millimeters to 5 millimeters. For this reason, the height h (the height in the sub-scanning direction) of the optical deflector 4 (i.e. the polygon mirror) becomes large, and the area of the optical deflector that is in contact with the air increases. Thus, a problem arises where the electric power consumption increases due to the influence of the windage loss caused during a high speed rotation, the noise increases, and also the costs increases. In addition, because the cost ratio of the optical deflector 4 among the constituent elements of an optical scanning device is high, having to use a large optical deflector creates a significant problem in terms of cost.

On the contrary, with the arrangement of the optical scanning device according to the first embodiment of the present invention as shown in FIGS. 1 and 2, the light beams that are emitted from the plurality of light source devices and are reflected by the deflecting reflection surface of the polygon mirror serving as the optical deflector 4 are made incident at an angle, in the sub-scanning direction, with respect to the line normal to the deflecting reflection surface of the polygon mirror. Consequently, as shown in FIG. 3B, it is possible to reduce the height h of the polygon mirror serving as the optical deflector 4 by a significant amount. Also, it is possible to have the polyhedron providing the deflecting reflection surface of the polygon mirror as one layer and also to make the thickness in the sub-scanning direction small. Thus, it is possible to have an advantage where the inertia of the rotating body is small and the time period required for activating the optical deflector 4 is shortened.

Unless the shape, in the main-scanning direction, of the incident surface of a scanning lens included in a scanning optical system, especially of a scanning lens having a strong refracting power in the sub-scanning direction (e.g. the second scanning lens 22 in the example shown in FIG. 1) is in the shape of an arc centered on the reflection point of the light beam on the deflecting reflection surface, the distance between the deflecting reflection surface of the optical deflector 4 and the incident surface of the scanning lens varies depending on the height of the lens in the main-scanning direction. Generally speaking, it is difficult to make a scanning lens in the shape of an arc because of the requirement to maintain a high level of optical performance. In other words, as shown in FIG. 1, light beams are normally deflected and scanned by the optical deflector 4 and become incident at an angle in the main-scanning direction, and never become incident perpendicularly with respect to the lens surface, at the main-scanning cross-sectioned plane with any image height.

Figure 4:
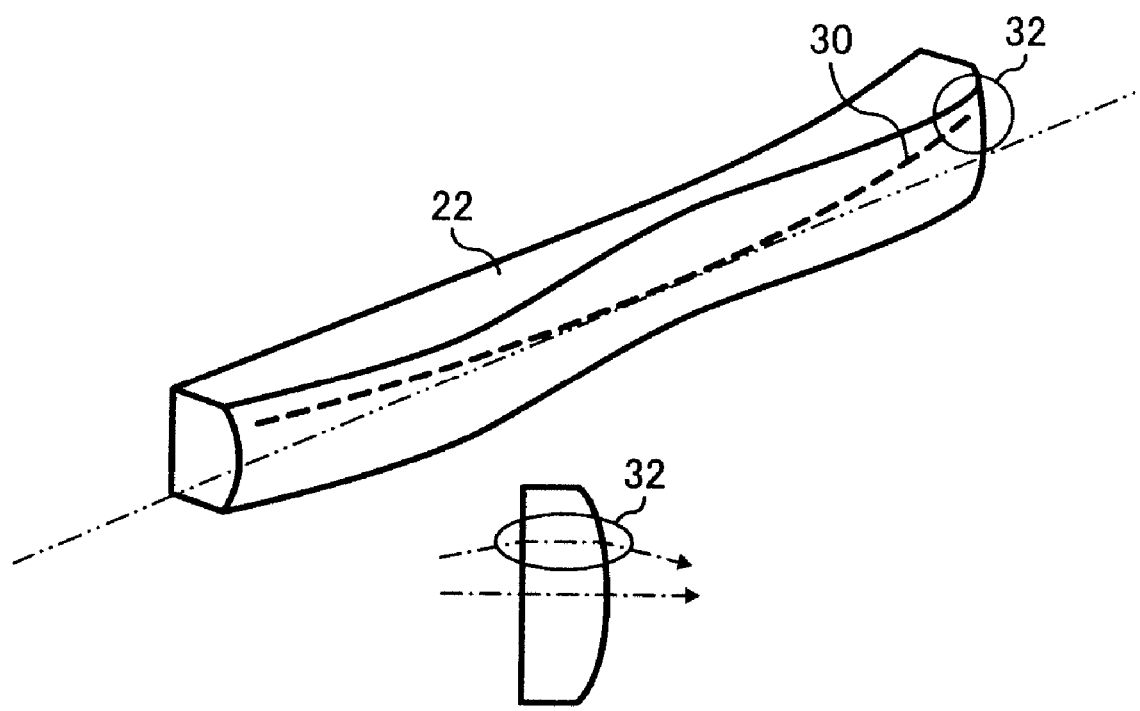
FIG. 4 is a perspective view for showing that a scanning line is curved in the scanning lens due to the arrangement in which the light beam is made obliquely incident to the deflecting reflection surface.

Because the light beams are configured to be obliquely incident to the deflecting reflection surface at an angle, in the sub-scanning direction, the light beams deflected and reflected by the optical deflector 4 have mutually different distances, depending on the image height, the distances being between the deflecting reflection surface of the optical deflector 4 and the incident surface of the scanning lens. As shown with a dotted line 30 in FIG. 4, the closer it is to the periphery of the lens, the higher or the lower (depending on the direction of the angle, in the sub-scanning direction, of the light beam) the incident height, in the sub-scanning direction, to the second scanning lens 22 is positioned with respect to the center. As a result, when a light beam passes through a surface that has a refracting power in the sub-scanning direction, the light beam receives different levels of refracting power in the sub-scanning direction. Thus, it turns out that the scanning line has a bending. In a normal example where a light beam becomes incident horizontally, even if the distance between the deflecting reflection surface and the incident surface of the scanning lens varies, because the light beam travels horizontally with respect to the scanning lens, the position, in the sub-scanning direction, at which the light beam becomes incident to the scanning lens does not vary. Thus, no bendings of scanning lines are observed.

Bendings of scanning lines change according to a change in the temperature. In recent years, to have freedom in the designing of the shape of lenses (e.g. an aspheric shape) in terms of the requirements related to the costs and high image quality, plastic is popularly used as a material for scanning lenses. Consequently, the shape of plastic lenses changes more with changes in temperature than the shape of glass lenses. As explained above, in an oblique incident optical system, a light beam is incident to the scanning lens while being curved in the sub-scanning direction; therefore, if a change in the temperature causes a change in the bending radius of the scanning lens, a change in the thickness of the scanning lens, or a change in the incident angle or the position in the sub-scanning direction of the light beam being incident to the scanning lens, the scanning line will have a bending because the refraction varies depending on the main-scanning direction. In a normal example where the light beam is incident horizontally, even if the distance between the deflecting reflection surface and the incident surface of the scanning lens varies, because the light beam travels horizontally with respect to the scanning lens, the incident position, in the sub-scanning direction, on the scanning lens is substantially at the same height as the optical axis and does not vary. Thus, the degree of occurrence of bendings of scanning lines is extremely small. In other words, when a normal lens is used, because a light beam passes through on a generatrix, even if the bending radius varies due to a change in the temperature, the light beam does not get refracted in the sub-scanning direction although the image forming position (the defocusing direction) may vary. Even if the light beam should get refracted by any chance, because the extent of refraction is so little that the degree of the bending of the scanning line is extremely small. In other words, the change in the position on the scanning surface, in the sub-scanning direction, of the scanning line is extremely small.

As explained above, occurrence of a large bending of a scanning line is a problem unique to the oblique incident optical systems. The direction of the bending of the scanning line is different for each of the two sides, in the sub-scanning direction, of the line normal to the deflecting reflection surface. To be more specific, the bending of the scanning line of the light beam being incident from the area A in FIG. 2 is in an opposite direction of the bending of the scanning line of the light beam being incident from the area B in FIG. 2. This is because the direction of the bending of the scanning line being incident to the scanning lens is inverted depending on the direction of the incident angle, in the sub-scanning direction, of the light beam being incident to the scanning lens, in other words, depending on the direction of the oblique incident (depending on whether the light beam is incident from the area A side or the area B side, in FIG. 2). In particular, curves in a scanning line being incident to a scanning lens having a strong refracting power in the sub-scanning direction result in a bending of the scanning line. The reason for this is described above.

In the similar way, when there is a change in the temperature, the changes observed in the bendings of the scanning lines are also in inverted directions when the two sides, in the sub-scanning direction, of the line normal to the deflecting reflection surface are compared. Because the directions of the bendings of the scanning lines are inverted when the different scanning surfaces are compared, images in a plurality of colors that are formed as a result of the scanning of the optical scanning devices and are overlapped on top of one another will exhibit a color registration error. Thus, the quality of the color image is remarkably lowered.

According to the first embodiment, the number of reflection mirrors reflecting toward the sub-scanning direction is different for each of the two sides, in the sub-scanning direction, of the line normal to the deflecting reflection surface. More specifically, an odd number of reflection mirrors are used for one side, and an even number of reflection mirrors are used for the other side. Because a scanning line refracted in the sub-scanning direction by a reflection mirror is inverted in the sub-scanning direction, even if the directions of the bendings of the scanning lines are different when the two sides, in the sub-scanning direction, of the line normal to the deflecting reflection surface are compared, as described above, it is possible to make the directions of the bendings of the scanning direction the same as each other. Consequently, it is possible to inhibit occurrence of color registration errors in the color overlapping process in an image forming apparatus for forming color images. Thus, it is possible to achieve color images in high quality.

As for bendings of scanning lines, the larger the oblique incident angle is, the larger the bending of the scanning line being incident to the scanning lens is, and also, the larger the degree of the bending of the scanning line is. To be more specific, according to the first embodiment described above, the degree of the bendings of the scanning lines of the two light beams on the outside is larger than that of the two light beams on the inside. Also, as shown with the reference numeral 32 in FIG. 4, the degree of the bending of the scanning line observed when there is a change in the temperature is also large for a light beam passing on the outside, in the main-scanning direction, of the scanning lens 22. However, according to the first embodiment, it is possible to make the directions of the bendings of the scanning lines the same as each other; therefore, it is possible to inhibit occurrence of color registration errors.

Figure 5A:
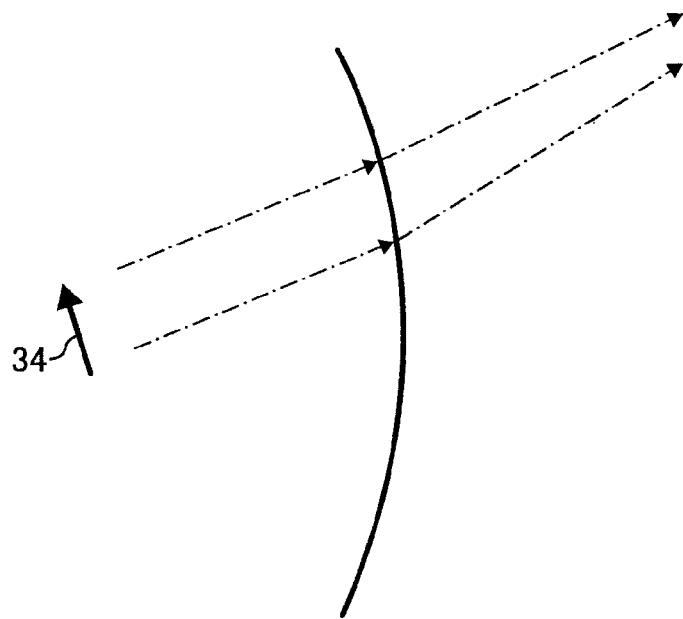
FIGS. 5A and 5B are drawings for showing the changes in the bending of the scanning line when the light flux being incident to the lens has shifted in the sub-scanning direction, according to a second embodiment of the present invention.

To make the influence of bendings of scanning lines and color registration errors that are observed in an oblique incident optical system smaller, it is preferable to keep the degree of bendings of scanning lines small at the time when the apparatus is designed. By shifting, in the sub-scanning direction, a scanning lens having a strong refracting power in the sub-scanning direction so as to make it eccentric, or by tilting, in the sub-scanning direction, the scanning lens so as to make it eccentric, it is possible to keep the degree of bendings of scanning lines small. To achieve a better correction process, by shifting or tilting the scanning lens in the sub-scanning direction so as to make it eccentric, by mutually different amounts in the main-scanning direction, it is possible to have the generatrix curved in the sub-scanning direction and to deflect light beams traveling toward different image heights. Thus, it is possible to properly correct the bendings of the scanning lines observed in the oblique incident optical system. However, as shown in FIG. 5A, because the bending is made in the sub-scanning direction on a surface at which the generatrix is curved, due to the influence of assembly errors, process errors, environment variation, or the like, when the light flux being incident to the lens is shifted in the sub-scanning direction as shown with the arrow 34, the light flux receives the influence of the refracting power of the lens in the sub-scanning direction. Thus, a problem arises where the shape of the bending of the scanning line changes, and the effect of inhibiting the color registration errors is not achieved for color images, as expected at the initial stage (or at the designing stage), and as a result, a color registration error occurs.

Figure 5B:
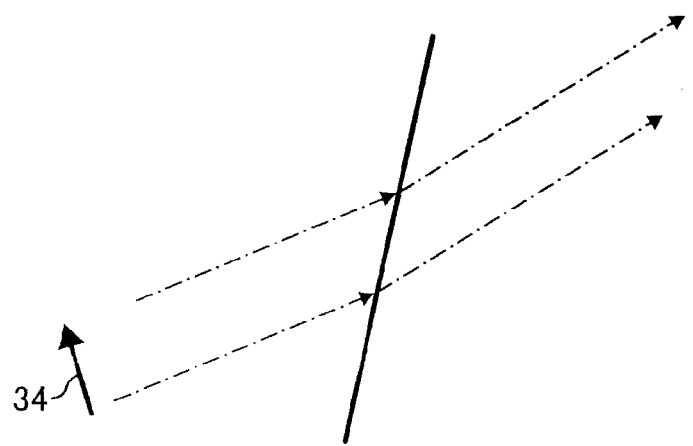

According to a second embodiment of the present invention, to keep the degree of bendings of scanning lines small more effectively and constantly, the shape, in the sub-scanning direction, of at least one surface of the scanning lens is arranged to be flat with no bendings, as shown in FIG. 5B, and also the lens has a special surface so that the eccentricity angle (the tilt amount) in the transversal direction (the sub-scanning direction) of the lens varies depending on the height of the lens in the longitudinal direction (the main-scanning direction) of the lens. Thus, the bendings of the scanning lines are corrected. The tilt amount (the eccentricity angle) of the special surface denotes an inclination angle in the transversal direction on the optical surface of an optical element. When the tilt amount is zero, there is no inclination; therefore, the lens is the same as a normal lens.

The surface shape of the special surface is calculated according to the equation defining a shape, shown below. It should be noted, however, that the contents of the present invention are not limited to the shape-defining equation. It is possible to identify the same shape of the surface using a different shape-defining equation. In Equation (1) below, RY denotes a paraxial bending radius within a "main-scanning cross-sectioned plane", which includes the optical axis and is a flat cross-sectioned plane parallel to the main-scanning direction. Y denotes a distance from the optical axis in the main-scanning direction. A, B, C, D, . . . are high order coefficients. RZ denotes a paraxial bending radius within a "sub-scanning cross-sectioned plane", which is orthogonal to the main-scanning cross-sectioned plane.

$$X(Y, Z) \frac{Y^{\wedge}2 \cdot Cm}{1 + \sqrt{[1-(1+K)\cdot(Y\cdot Cm)^{\wedge}2]}} + A \cdot Y^{\wedge}4 + B \cdot Y^{\wedge}6 +$$
$$C\cdot Y^{\wedge}8 + D\cdot Y^{\wedge}10 + E\cdot Y^{\wedge}12\ldots + \frac{Cs(Y)\cdot Z^{\wedge}2}{1+\sqrt{[1-(Cs(Y)\cdot Z)^{\wedge}2]}} +$$
$$(F0 + F1\cdot Y + F2\cdot Y^{\wedge}2 + F3\cdot Y^{\wedge}3 + F4\cdot Y^{\wedge}4 + \ldots)Z$$

where Cm=1/RY and Cs(Y)=1/RZ. A tilt amount is expressed by (F0+F1·Y+F2·Y^2+F3·Y^3+F4·Y^4+. . . )Z. When there is no tilt amount, all the values of F0, F1, F2, and so on are zero. When the values of F0, F1, F2, and so on are not zero, the tilt amount varies in the main-scanning direction.

As shown with the reference numeral 34 in FIG. 5B, when the light beam being incident is shifted in the sub-scanning direction, because the special surface has no refracting power, the traveling direction of the light beam only shifts, and the change in the direction of the light beam is small. When a surface has a bending in the sub-scanning direction such as the surface with which the generatrix is curved, in other words, when the surface has a refracting power, when the light beam being incident is shifted in the sub-scanning direction, as shown in FIG. 5A, the traveling direction of the light beam changes when there is a change in the refracting power. When the amount of the change in the traveling direction is different for each of different image heights, the degree of the bending of the scanning line becomes large. Also, in addition to the light flux being skew, the wave aberration is degraded, and the beam spot diameter is degraded, too. For these reasons, it is required that the shape, in the sub-scanning direction, of the special surface is flat with no bendings.

According to the second embodiment, it is possible to correct, with the special surface, the bending of the scanning line by giving appropriate tilt amounts that are mutually different in the main-scanning direction of the scanning lens, to the directions, in the sub-scanning direction, of the light beams traveling toward different image heights. Also, by arranging the special surface to be appropriate for each of the light beams traveling toward mutually different scanning surfaces, in other words, for each of the different angles (i.e. the oblique incident angles), in the sub-scanning direction, with respect to the line normal to the reflection surface of the optical deflector, it is possible to properly correct the wave aberrations and the bendings of the scanning lines for all the light beams. In this example, even if there are different oblique incident angles, it is possible to address the problem by using the special surface and by appropriately changing the design with adjustment of the coefficients in the shape-defining equation. With the special surface, it is also possible to correct degradation in the wave aberration that is caused by the use of an oblique incident optical system.

As explained before, unless the shape, in the main-scanning direction, of the incident surface of a scanning lens included in a scanning optical system is in the shape of an arc centered on the reflection point of the light beam on the deflecting reflection surface, the distance between the deflecting reflection surface of the optical deflector and the incident surface of the scanning lens varies depending on the image height. Generally speaking, it is difficult to make a scanning lens in the shape of an arc because of the requirement to maintain a high level of optical performance. In other words, light beams are normally deflected and scanned by an optical deflector and become incident at an incident angle in the main-scanning direction, and never become incident perpendicularly with respect to the lens surface, at the main-scanning cross-sectioned plane with any image height.

A light flux of the light beams deflected and reflected by the optical deflector has a certain width in the main-scanning direction. The light beams on either end, in the main-scanning direction, of the light flux become incident while being distorted with respect to the scanning lens, because the distance between the deflecting reflection surface of the optical deflector and the incident surface of the scanning lens is different and also because these light beams are at an angle in the sub-scanning direction (due to the oblique incident). As a result, the wave aberration is significantly degraded, and the beam spot diameter becomes large. As shown in FIG. 1, the closer it is to the periphery image height, the more inclined the incident angle, in the main-scanning direction, is, and also the larger the distortion of the light flux is. The closer it is to the periphery, the more prominent the enlargement of the beam spot diameter due to the degradation of the wave aberration is.

To correct the wave aberration and the bendings of scanning lines properly, it is preferable to have at least two scanning lenses and to apply the special surface to each of the scanning lenses. The wave aberration is to be corrected by the special surface of one of the scanning lenses that is positioned closer to the optical deflector (i.e. the scanning lens that is positioned on the optical deflector side with respect to the scanning lens having a strong refracting power in the sub-scanning direction). The bending of the scanning line is corrected by the special surface of the other of the scanning lenses that is positioned closer to the scanning surface (i.e. the scanning lens having a strong refracting power in the sub-scanning direction). By separating the correcting functions this way, it is possible to achieve the effects of making the beam spot diameter even smaller and reducing the degree of the bending of the scanning line. Needless to say, it is not necessary to separate the correcting functions completely; an arrangement is acceptable in which each of the special surfaces is responsible for a part of the correction of the wave aberration and a part of the correction of the bending of the scanning line.

As explained above, the closer it is to the periphery image height, the more inclined the incident angle, in the main-scanning direction, to a scanning lens is, and also the larger the distortion of the light flux is. The closer it is to the periphery image height, the more prominent the enlargement of the beam spot diameter due to the degradation of the wave aberration is. Accordingly, it is preferable to arrange the special surface according to the second embodiment to be in such a shape that the farther it is from the optical axis in the main-scanning direction, the larger the eccentricity amount is. Because the light flux of light beams near the optical axis, in other words, the light flux of light beams near the central image height is incident substantially perpendicularly with respect to the lens surface, the degradation in the wave aberration caused by the light beams being at an angle in the sub-scanning direction is small. Consequently, by having an arrangement in which the farther it is from the optical axis in the main-scanning direction, the larger the eccentricity amount is, and by correcting the degradation in the wave aberration caused by the distortion of the light flux, it is possible to achieve a high level of optical performance and a good beam spot diameter.

According to the second embodiment, by correcting the bending of the scanning line caused by the use of an oblique incident optical system at the time when the apparatus is designed, it is possible to achieve high image quality. In view of color registration errors, as explained in the description of the first embodiment, by appropriately arranging the number of reflection mirrors reflecting toward the sub-scanning direction, it is possible to reduce the degrees of both the bending of the scanning line caused by an oblique incident and the bending of the scanning line caused by a change in the temperature, by making the directions the same as each other. According to the second embodiment, it is possible to reduce the absolute amount of the remaining bending of the scanning line and to achieve even higher image quality. In addition, when the one-side scanning method is used, the amount of the bending of the scanning line observed at the time when the apparatus is designed varies depending on the oblique incident angle. However, as described earlier, by correcting the bending of the scanning line using one of the methods described above at the time when the apparatus is designed, it is possible to reduce the amount of the remaining bending of the scanning line caused by the oblique incident. Thus, the situation with regard to the color registration errors is improved significantly.

Figure 6A:
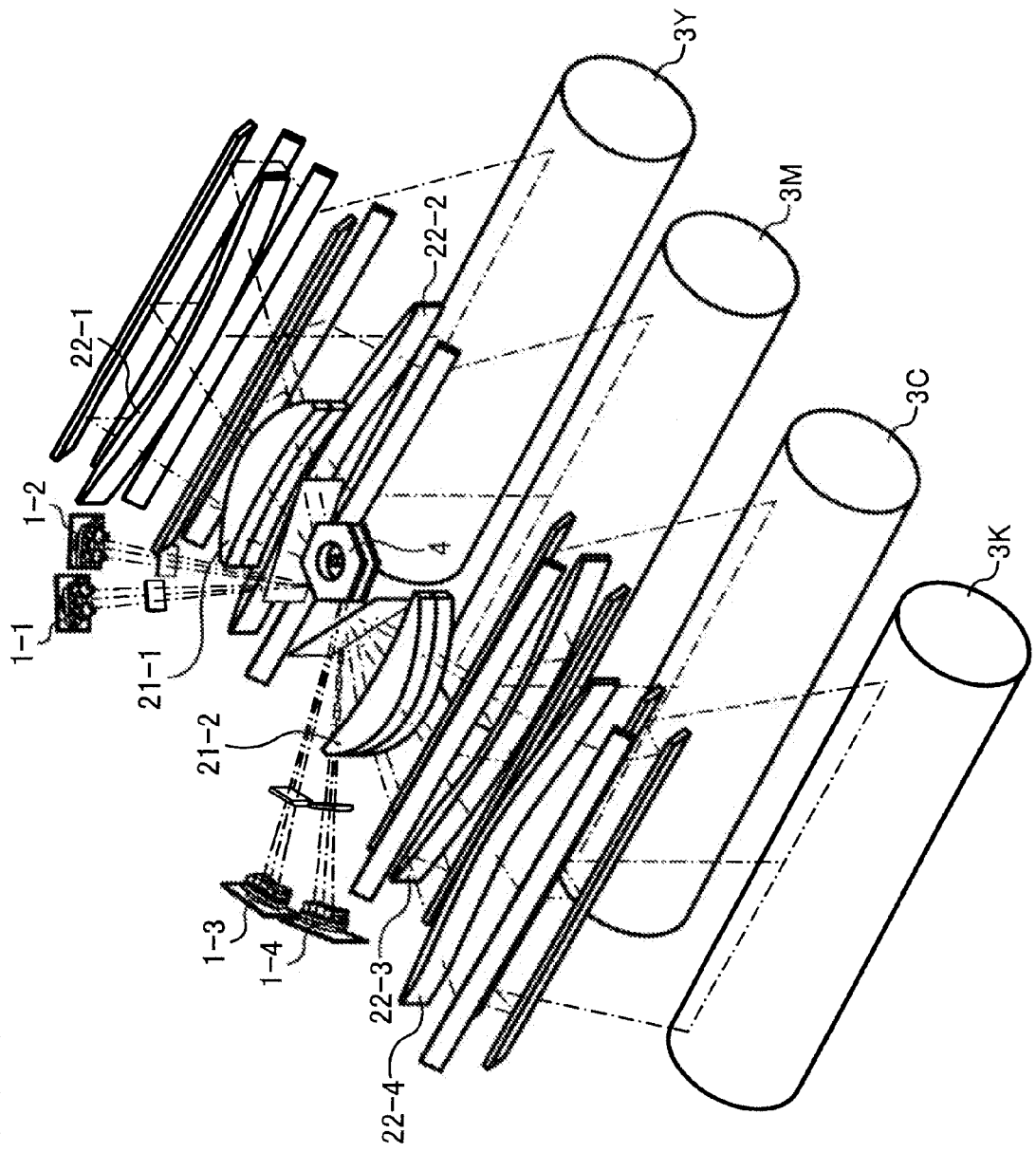
FIGS. 6A and 6B are drawings an optical scanning device according to a third embodiment of the present invention.
Figure 6B:
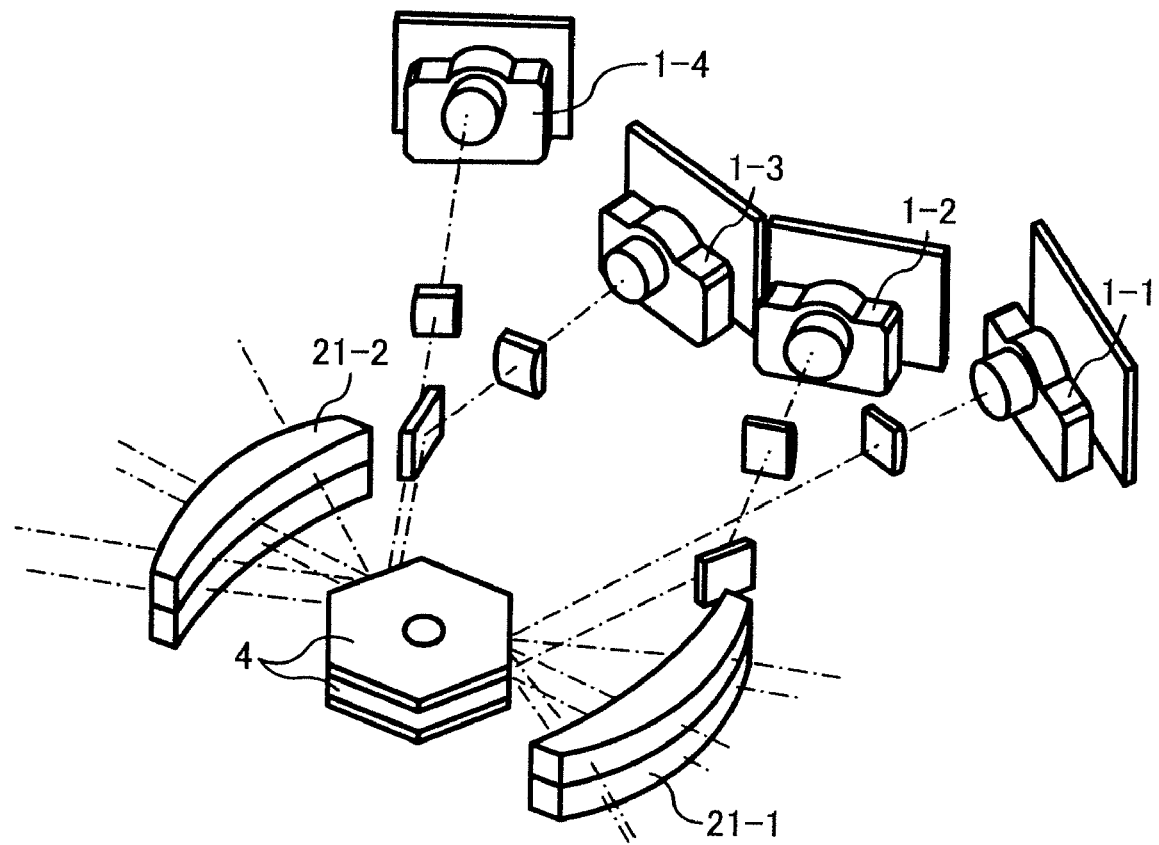

An optical scanning device according to a third embodiment of the present invention includes a plurality of pairs of light beams emitted from a plurality of light source devices and uses an opposite scanning method by which each pair of light beams becomes incident to a different one of the deflecting reflection surfaces of a same optical deflector. FIGS. 6A and 6B are drawings of the optical scanning device according to the third embodiment, using the opposite scanning method. FIG. 6A is a drawing for showing the overall structure of the optical scanning device. FIG. 6B is a drawing for showing the light source units, the optical deflector, and a part of the scanning and image forming optical system included in the optical scanning device. In FIGS. 6A and 6B, the four light source units 1—1, 1-2, 1-3, and 1-4 may be separated into a pair of light source units 1—1 and 1-2 and another pair of light source units 1-3 and 1-4. The laser beams emitted from the one pair of two light source units 1—1 and 1-2 are incident to the deflecting reflection surface of the optical deflector 4, which serves as an optical deflector, from the right side of the optical deflector 4. The laser beams emitted from the other pair of two light source units 1-3 and 1-4 are incident to the deflecting reflection surface of the optical deflector 4, which serves as an optical deflector, from the left side of the optical deflector 4. The laser beam emitted from the light source unit 1—1 is configured to be deflected and reflected by the deflecting reflection surface of the optical deflector 4, to pass through the first scanning lens 21-1 and the second scanning lens 22-1 that are included in the scanning and image forming optical system, to be reflected by appropriate mirrors, and then to be introduced to a surface of a photosensitive member 3Y, which serves as a scanning surface. The laser beam emitted from the light source unit 1-2 is configured to be deflected and reflected by the deflecting reflection surface of the optical deflector 4, to pass through the first scanning lens 21-1 and the second scanning lens 22-2 that are included in the scanning and image forming optical system, to be reflected by appropriate mirrors, and then to be introduced to a surface of a photosensitive member 3M, which serves as a scanning surface. The laser beam emitted from the light source unit 1-3 is configured to be deflected and reflected by the deflecting reflection surface of the optical deflector 4, to pass through the first scanning lens 21-2 and the second scanning lens 22-3 that are included in the scanning and image forming optical system, to be reflected by appropriate mirrors, and then to be introduced to the surface of the photosensitive member drum 3C, which serves as a scanning surface. The laser beam emitted from the light source unit 1-4 is configured to be deflected and reflected by the deflecting reflection surface of the optical deflector 4, to pass through the first scanning lens 21-2 and the second scanning lens 22-4 that are included in the scanning and image forming optical system, to be reflected by appropriate mirrors, and then to be introduced to a surface of a photosensitive member 3K, which serves as a scanning surface.

The one pair of light source units 1-1 and 1-2 are positioned so as to be out of alignment in the main-scanning direction, in other words, in a direction parallel to the deflection surface for the laser beams deflected by the optical deflector 4 and also, are positioned so as to be out of alignment in the sub-scanning direction, in other words, in a direction orthogonal to the deflection surface. The laser beam emitted from the light source unit 1-1 is configured to be incident to the deflecting reflection surface of the optical deflector 4. The laser beam emitted from the light source unit 1-2 is configured to be incident to the deflecting reflection surface of the optical deflector 4 after being reflected by mirrors. The laser beams emitted from the pair of light source units 1-1 and 1-2 are configured to be incident at an angle in the sub-scanning direction, in other words, to be obliquely incident with respect to the line normal to the deflecting reflection surface. The other pair of light source units 1-3 and 1-4 is positioned so as to be symmetrical to the pair of light source units 1-1 and 1-2 with respect to the optical deflector 4. The laser beams emitted from the pair of light source units 1-3 and 1-4 are configured to be incident at an angle in the sub-scanning direction, in other words, to be obliquely incident with respect to the line normal to the deflecting reflection surface. As for the number of mirrors being used, FIG. 8 is accurate whereas FIGS. 6A and 6B are not accurate.

Figure 7A:
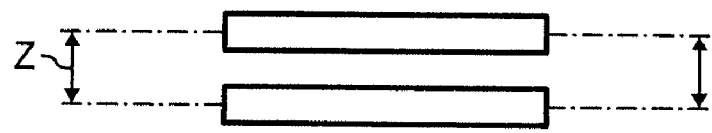
FIGS. 7A and 7B are drawings of examples of polygon mirrors used as optical deflectors.
Figure 7B:
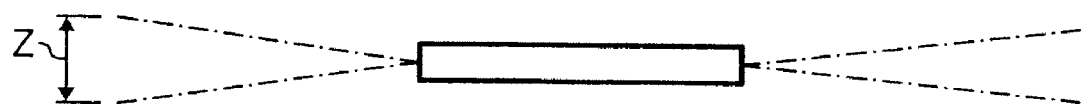

In the optical scanning device using the opposite scanning method as shown in FIGS. 6A and 6B, polygon mirrors arranged to be positioned in two layers are used as an optical deflector so that there is a sufficient distance Z for separating the light fluxes respectively traveling toward corresponding ones of the scanning surfaces, as shown in FIG. 7A. It is acceptable to arrange the polygon mirrors to be positioned in one layer, instead of arranging them to be positioned in two layers; however, when the polygon mirrors are arranged to be positioned in one layer, the thickness, in the sub-scanning direction, of the polygon mirror unit becomes large, and it is not suitable for achieving a high speed and a low cost. On the other hand, when an oblique incident optical system is used like in the exemplary embodiments of the present invention, there is no need to put a predetermined distance in the sub-scanning direction between a plurality of light beams at the deflecting reflection surface of the polygon mirror. To be more specific, as shown in FIG. 7B, a pair of light beams that are emitted from a plurality of light source devices and are at mutually different angles, in the sub-scanning direction, with respect to the line normal to the reflection surface of the polygon mirror is made incident to the mutually different reflection surfaces of one polygon mirror from the left side and from the right side. With this arrangement, it is possible to have the polyhedron providing the deflecting reflection surfaces of the polygon mirror as one layer and also to make the thickness of the polygon mirror in the sub-scanning direction small. Thus, it is possible to have an arrangement in which the inertia of the rotating body is small and the time period required for activating the optical deflector is shortened. In addition, it is possible to reduce the costs of polygon mirrors, compared to polygon mirrors arranged in two layers used in an apparatus according to a conventional technology that uses the opposite scanning method.

In an optical system that uses, for example, the opposite scanning method and one side of which corresponds to two mutually different scanning surfaces, by having an arrangement in which all the light beams, in other words, all the light beams traveling toward the two mutually different scanning surfaces are at angles with respect to the line normal to the reflection surface of the optical deflector, in other words, at angles in the sub-scanning directions, it is possible to reduce the cost of the optical deflector, which has a high cost ratio among the constituent elements of an optical scanning device and also to provide an environmentally friendly optical scanning device that makes it possible to reduce electric power consumption and noises.

The optical scanning device according to a third embodiment of the invention has a plurality of pairs of light beams that are emitted from the plurality of light source devices and that become incident from both sides, in the sub-scanning directions, of the line normal to the deflecting reflection surface of the optical deflector. Each pair of light beams becomes incident to mutually different deflecting reflection surfaces of a same optical deflector. Of light beams that are incident to the mutually different deflecting reflection surfaces, for the light beams that become incident from the same direction, in terms of the sub-scanning direction, with respect to the line normal to the deflecting reflection surface, mutually different numbers, namely an even number and an odd number, of reflection mirrors reflecting toward the sub-scanning direction are disposed on the optical path from the deflecting reflection surfaces to the corresponding scanning surfaces. To be more specific, as shown in FIG. 8, on the paths corresponding to the light beams a and a' that are incident to the mutually different deflecting reflection surfaces from the area A on one side of the line normal to the deflecting reflection surface, an even number of reflection mirrors reflecting toward the sub-scanning direction are disposed for the light beam a, whereas an odd number of reflection mirrors are disposed for the light beam a'. On the paths corresponding to the light beams b and b' that are incident to the mutually different deflecting reflection surfaces from the area B on the other side of the line normal to the deflecting reflection surface, an odd number of reflection mirrors reflecting toward the sub-scanning direction are disposed for the light beam b that is incident to the same deflecting reflection surface as the light beam a is, whereas an even number of reflection mirrors are disposed for the light beam b' that is incident to the same deflecting reflection surface as the light beam a' is. To be more specific, the light beam a' that travels toward the photosensitive member ST1 passes through the first scanning lens 21-1, the reflection mirror 251, and the second scanning lens 22-1. The light beam b' that travels toward the photosensitive member ST2 passes through the first scanning lens 21-1, the reflection mirrors 261 and 262, and the second scanning lens 22-2. The light beam a that travels toward the photosensitive member ST3 passes through the first scanning lens 21-1, the reflection mirrors 271 and 272, and the second scanning lens 22-3. The light beam b that travels toward the photosensitive member ST4 passes through the first scanning lens 21-1, the reflection mirror 281, and the second scanning lens 22-4. The relationship between the even numbers and the odd numbers for the reflection mirrors may be interchanged between the area A and the area B.

Figure 10A:
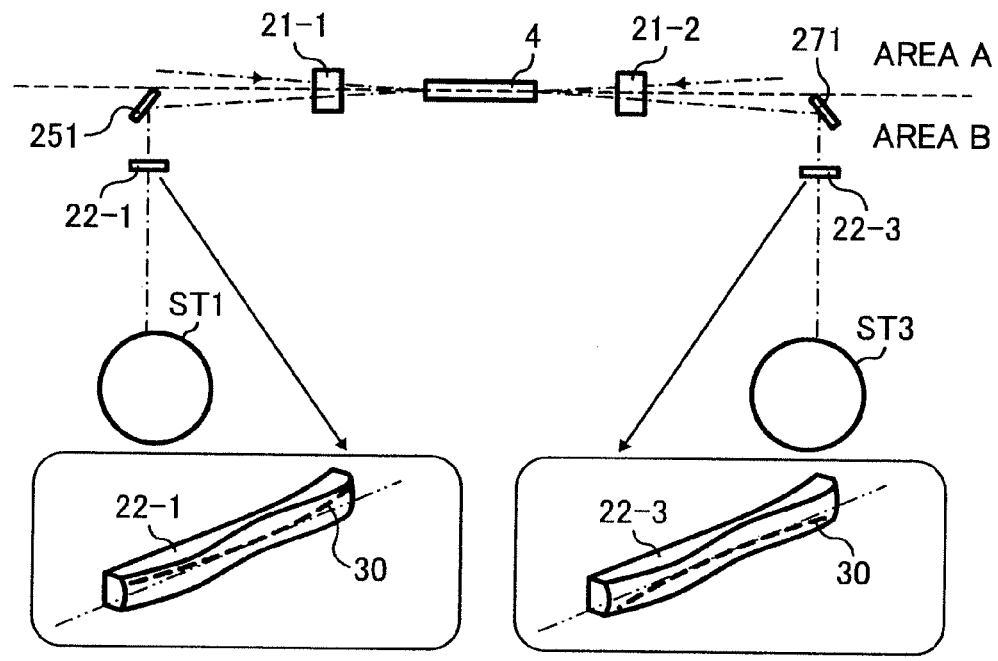
FIGS. 10A and 10B are drawings for showing, in contrast to FIGS. 9A and 9B, an example to which the technical ideas of the present invention are not applied.
Figure 10B:
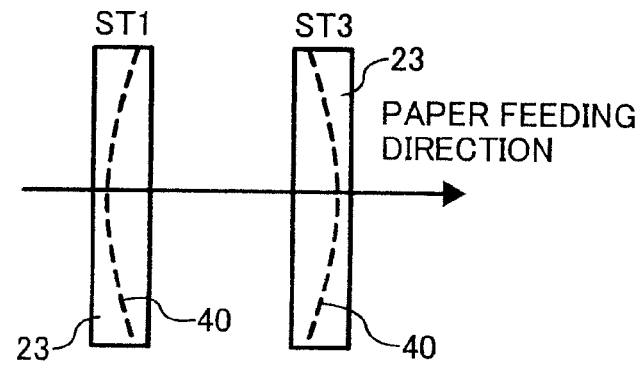

When the opposite scanning method is used, the directions of the bendings of the scanning lines of the light beams that are deflected and scanned on mutually different deflecting reflection surfaces are mutually inverted to the opposite direction, when the numbers of reflection mirrors reflecting toward the sub-scanning direction are the same, as shown in FIGS. 10A and 10B. The light beams a and a' are obliquely incident to the deflecting reflection surface of the optical deflector from the same direction in terms of the sub-scanning direction. For example, the scanning lines of the light beams that are incident to a lens having a strongest refracting power in the sub-scanning direction have mutually different bending directions, as shown with the reference numeral 30 in FIG. 10A. Also, as shown in FIG. 10B, the bendings of scanning lines 40 on the scanning surfaces 23 are also inversions of each other. The reason for this is because the direction of the oblique incident is the same for the light beam a and the light beam a', the directions of the bendings of the scanning lines occurring in the traveling directions of the light beams are the same; however, because the light beam a and the light beam a' travel in different directions after being deflected by the deflecting reflection surface, the shapes are inversions of each other on the scanning surfaces 23. In other words, when the opposite scanning method is used, for the light beams that are reflected and deflected on mutually different deflecting reflection surfaces and are obliquely incident to the optical deflector from the same direction, to make the directions of the bendings of the scanning lines of these light beams the same as each other, it is necessary to have an arrangement in which an even number of reflection mirrors reflecting toward the sub-scanning direction are disposed in an area on one side, whereas an odd number of reflection mirrors reflecting toward the sub-scanning direction are disposed in another area on the other side, in correspondence with each of the light beams. The same is applied for making the directions of the bendings of the scanning lines caused by a change in the temperature the same as each other, as explained earlier.

According to the third embodiment, as shown in FIG. 8, for the light beams that are incident from the same direction in terms of the sub-scanning direction with respect to the line normal to the deflecting reflection surface, mutually different numbers of reflection mirrors, namely an even number of reflection mirrors and an odd number of reflection mirrors, that reflect toward the sub-scanning direction are disposed on the optical paths from the deflecting reflection surfaces to the scanning surfaces. For the light beams being incident from the area A, two (an even number) reflection mirrors are disposed for the light beam a and one (an odd number) reflection mirror is disposed for the light beam a'. For the light beams being incident from the area B, one (an odd number) reflection mirror is disposed for the light beam b and two (an even number) reflection mirrors are disposed for the light beam b'. To provide more specific explanation, according to the third embodiment, for the light beams that are incident to the same deflecting reflection surface from the mutually different directions, in terms of the sub-scanning direction, for example, for the light beams a and b, or for the light beams a' and b', mutually different numbers of reflection mirrors, namely, an even number of reflection mirrors and an odd number of reflection mirrors, are disposed respectively.

Figure 9A:
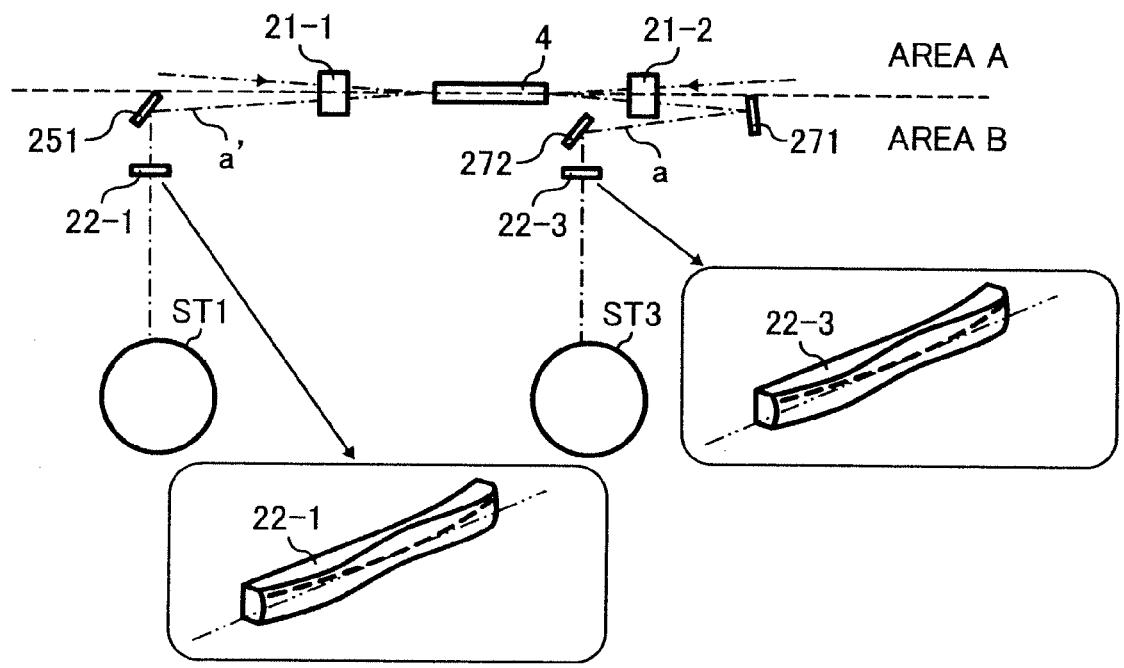
FIGS. 9A and 9B are drawings for showing another embodiment of the optical scanning device according to the present invention.
Figure 9B:
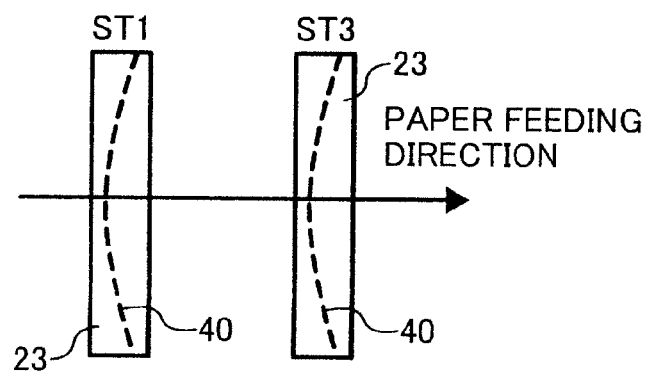

With this arrangement of the reflection mirrors being disposed, it is possible to make the directions of the bendings of the scanning lines 40 on the scanning surfaces 23 the same as each other, as shown in FIG. 9B. Thus, it is possible to reduce color registration errors in color image forming apparatuses and to form images in high quality. In the example shown in FIG. 9A, there is no reflection mirrors disposed between the second scanning lens 22-1 or 22-3 and the scanning surfaces; therefore, the directions of the bendings of the scanning lines on the second scanning lens 22-1 and 22-3 are made to be the same as each other. Bendings of scanning lines are caused by scanning lenses; however, the directions of the bendings do not vary depending on the directions of the bendings of the scanning lines on the scanning lens, but they vary depending on the number of reflection mirrors reflecting toward the sub-scanning direction. In FIGS. 9A to 10B, to keep the explanation simple, the examples in which there are two scanning surfaces are used; however, the configuration is similar in a structure in which there are for scanning surfaces, like in the example shown in FIG. 8.

Further, it is possible to make the amount of bendings of scanning lines caused by oblique incidents substantially equal for all of the light beams by having an arrangement in which, the light beams that are emitted from a plurality of light source devices and become incident from the both sides, in the sub-scanning direction, of the line normal to the deflecting reflection surface of the optical deflector have the same incident angle with each other, in an absolute value, in the sub-scanning direction with respect to the line normal to the deflecting reflection surface. By disposing an appropriate number of reflection mirrors, it is possible to reduce color registration errors significantly. In addition, as explained in the description of the second embodiment, it is possible to improve the efficiency in the designing process significantly by arranging the shape of the surface on which the bending of the scanning line is corrected, for example, the shape in the sub-scanning direction, to be flat with no bendings, and also arranging the shapes of the special surfaces the same as each other (the inverted shapes are considered to be the same shape of surface), the special surfaces having an arrangement in which the eccentricity angle (the tilt amount) in the transversal direction (the sub-scanning direction) of the lens varies depending on the height of the lens in the longitudinal direction (the main-scanning direction) of the lens. Further, because the amount of bendings of scanning lines caused by a change in the temperature is also arranged to be equal, it is possible to constantly form an image that has high quality and has few color registration errors even if there is a change in the temperature.

Figure 11:
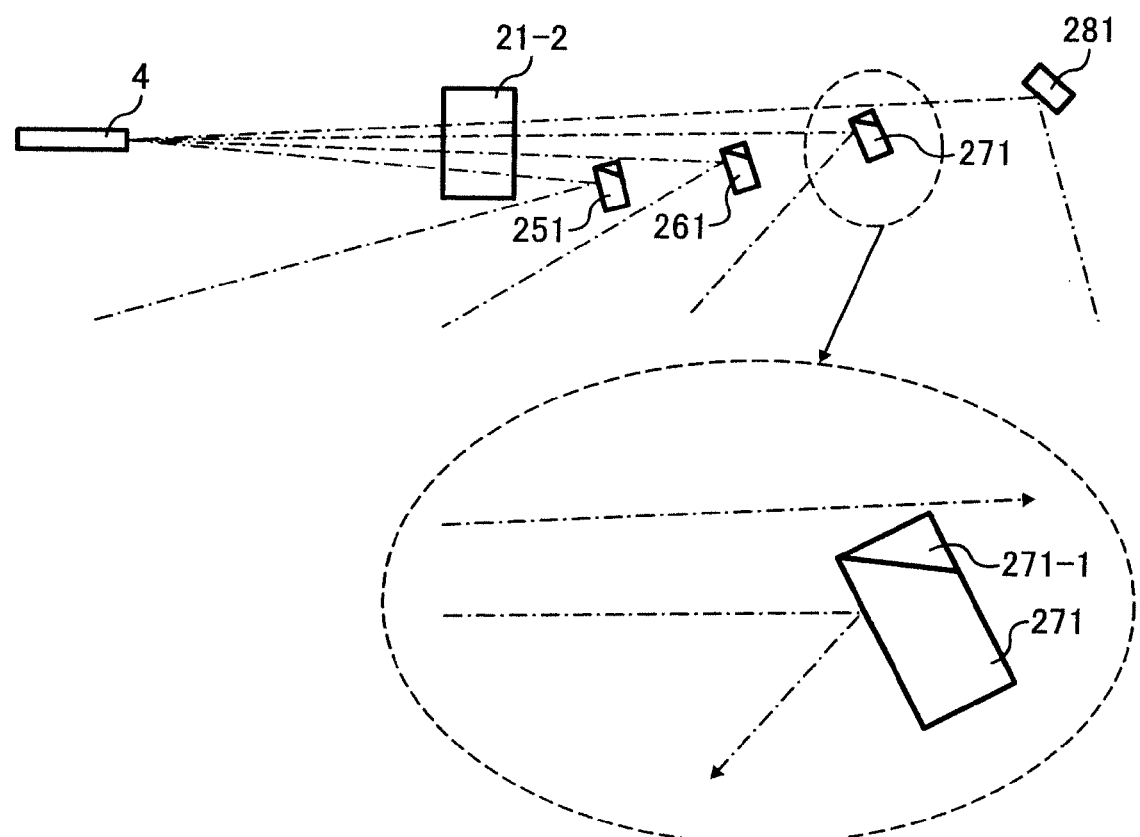
FIG. 11 is a side view of an optical scanning device according to a fourth embodiment of the present invention.

FIG. 11 is a side view of an optical scanning device according to a fourth embodiment of the present invention. As shown in FIG. 11, of the reflection mirrors reflecting toward the sub-scanning direction that are disposed on the optical path from the deflecting reflection surfaces to the scanning surfaces to which the light beams correspond respectively, the reflection mirror that is disposed so as to pass a light beam traveling toward a different scanning surface to the opposite side, in the sub-scanning direction, with respect to the direction of at least the light beam deflected and reflected is chamfered on the side on which the light beam traveling toward the different scanning surface passes. The exemplary embodiment shown in FIG. 11 is an example in which the one-side scanning method is used.

When the angle at which the light beam is obliquely incident to a deflecting reflection surface increases, various types of aberrations are degraded, and also the level of optical performance is degraded. To be more specific, due to the degradation of the wave aberration, the beam spot diameter is degraded, and the degree of the bendings in the scanning lines also increases. In view of the level of optical performance and making the optical scanning device compact, it is preferable to make the oblique incident angle as small as possible. When the oblique incident angle is small, it is difficult to separate the light beams for each of the corresponding scanning surfaces. Especially, as shown in FIG. 11, it is necessary to make the distances between the light beams larger as much as the thickness of the mirrors, for the reflection mirrors that are used for separating the light beams that travel toward mutually different scanning surfaces, in other words, for the reflection mirrors that are disposed so as to pass the light beams that travel toward mutually different scanning surfaces to the opposite side, in the sub-scanning direction, with respect to the direction of at least the light beam being deflected and reflected, namely, for the reflection mirrors 251, 261, 271. The reason for this is because other light beams would be interrupted by the edge portions of the reflection mirrors 251, 261, and 271, otherwise. To make the distances between the light beams larger, the oblique incident angle to the deflecting reflection surface needs to be larger, and this is not a preferable arrangement. Thus, in the exemplary embodiment shown in FIG. 11, of the reflection mirrors 251, 261, 271, and 281 that reflect toward the sub-scanning direction and that are disposed between the deflecting reflection surface and the scanning surfaces, the reflection mirrors 251, 261, and 271 that are disposed so as to pass light beams traveling toward the mutually different scanning surfaces to the opposite side, in the sub-scanning direction, with respect to the direction of at least the light beam being deflected and reflected is chamfered, as shown with a hatching, at the edge portions in which other light beam passes. As a result, the problem is solved, and it is possible to make the oblique incident angle of the light beams being incident to the deflecting reflection surface small.

Further, it is preferable to have an arrangement in which the number of reflection mirrors that reflect toward the sub-scanning direction and are disposed on the optical path for the light beam traveling toward the scanning surface that is positioned farthest away from the optical deflector is smaller than the number of reflection mirrors that are disposed on each of the optical paths for the lights beams traveling toward any of the other scanning surfaces. To make the directions of the bendings of scanning lines the same as each other, it is necessary to properly set the number of reflection mirrors with an even number and an odd number, as explained above. According to a fourth embodiment of the invention, by having an arrangement in which the number of reflection mirrors that correspond to the light beam traveling toward the scanning surface that is positioned farthest away from the optical deflector is smaller than the number of reflection mirrors correspond to the other light beams, it is possible to make the total number of reflection mirrors small, and to achieve a cost reduction. Because the lengths of the optical paths (the distances between the deflecting reflection surface and the scanning surfaces) for the light beams traveling toward different scanning surfaces are equal to one another, when the number of reflection mirrors that are disposed on the optical path to the scanning surface positioned farthest away from the optical deflector is large, it is difficult to reduce the number of mirrors that reflect the other light beams while having an appropriate number of reflection mirrors. It is extremely difficult to reduce the number of reflections, without changing the length of the light path, of the light beam traveling toward a scanning surface that is physically positioned close to the optical deflector. It is even more difficult to use an appropriate number of mirrors while having an even number of mirrors and an odd number of mirrors.

Figure 12:
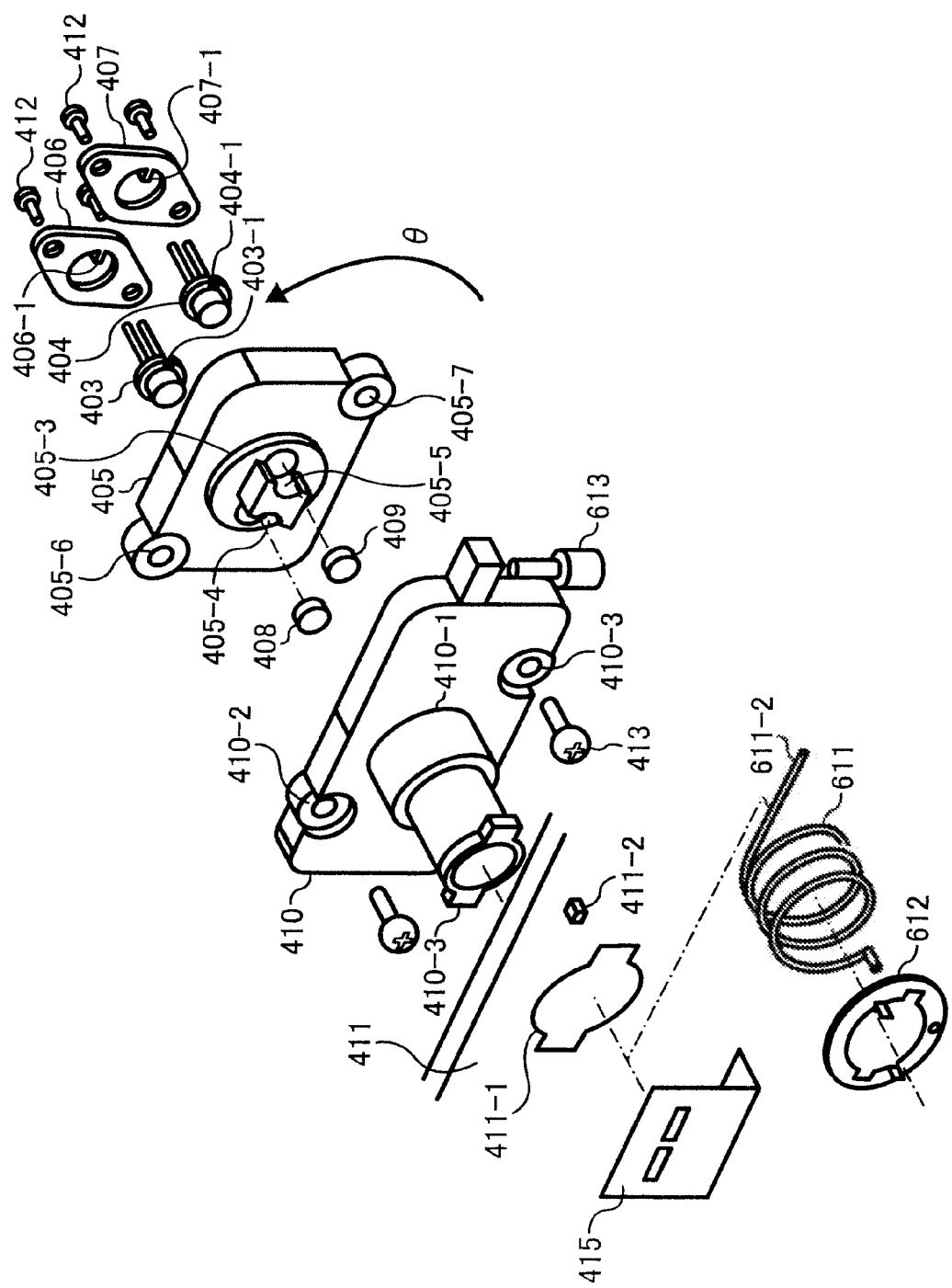
FIG. 12 is an exploded perspective view for showing an example of a light source unit applicable to the present invention.

In the optical scanning device according to the present invention, it is also a good idea to use, as the light source device, a semiconductor laser array having a plurality of light emission points, or a multi-beam light source device in which a plurality of light sources having either a single light emission point or a plurality of light emission points are used, so that a plurality of light beams are simultaneously scanned on the surfaces of the photosensitive members. With this arrangement, it is possible to structure an optical scanning device and an image forming apparatus with which a high speed and a high density are achieved. With the configurations of these optical scanning device and image forming apparatus, it is possible to achieve the same effects, as explained above. FIG. 12 is a drawing of an example of a light source unit to be included in a multi-beam light source device according to a fifth embodiment of the present invention.

In FIG. 12, semiconductor lasers 403 and 404 are individually fitted into fitting holes (not shown) that are formed on the back of a base member 405. Each of the fitting holes is slightly inclined at a predetermined angle in the main-scanning direction, in this exemplary embodiment, at approximately 1.5 degrees. Each of the semiconductor lasers 403 and 404 that are fitted in the fitting holes is also inclined at approximately 1.5 degrees, in the main-scanning direction. Each of heat sink units 403-1 and 404-1 that are each in a circular cylindrical shape and are respectively included in the semiconductor lasers 403 and 404 has a notch. Projections 406-1 and 407-1 that are formed in the circular holes at the centers of fastening members 406 and 407 are in alignment with the notches in the heat sink units 403-1 and 404-1, respectively, so that the directions of the light sources are in alignment. The fastening members 406 and 407 are fixed onto the base member 405 with screws 412 from the back side of the base member 405, and thus the semiconductor lasers 403 and 404 are fixed onto the base member 405. Outer circumferences of collimate lenses 408 and 409 are in alignment with attachment guiding surfaces 405-4 and 405-5 that are each in a semicircular shape and are provided on the base member 405, so that an adjustment is made in terms of optical axis direction and the collimate lenses 408 and 409 are adhered at the determined positions so that divergent beams emitted from the light emission points form parallel light fluxes.

According to the fifth embodiment, because the light beams emitted from the semiconductor lasers are configured to cross each other within the main-scanning plane, the fitting holes and the semicircular-shaped attachment guiding surfaces 405-4 and 405-5 are formed with an inclination along the directions of the light beams. By having an arrangement in which an engagement unit 405-3 in a circular cylindrical shape provided on the base member 405 is engaged with a holder member 410 and screws 413 are put through the through holes 410-2 so as to be screwed into screw holes 405-6 and 405-7, the base member 405 is fixed to the holder member 410, and thus the light source unit is structured. A circular cylindrical portion 410-1 of the holder member 410 included in the light source unit is fitted into a reference hole 411-1 in an attachment wall 411 of the optical housing, and a stopper member 612 is engaged with projections 410-3 on the circular cylindrical portion, after a spring 611 is inserted from the front side of the attachment wall 411. Thus, the holder member 410 is held on, and is in close contact with, the back side of the attachment wall 411. As a result, the light source unit is held as well. Because one end of the spring 611 is hooked onto a projection 411-2 on the attachment wall 411, and the other end of the spring 611 is hooked onto the light source unit, the light source unit has a rotation force that uses the center of the circular cylindrical portion as a rotation axis. An adjustment screw 613 that is configured to stop the rotation force of the light source unit is provided. The adjustment screw 613 makes it possible to rotate the whole unit in the θ direction, which is the direction to go around the optical axis, and to adjust the pitch. The front end of the light source unit has an aperture 415. The aperture 415 has slits each of which corresponds to a different one of the semiconductor lasers. When the light source is installed in an optical housing, the emission diameters of light beams are defined by the slits. Instead of the semiconductor lasers, semiconductor laser arrays having a plurality of light emission points may be used. Needless to say, it is acceptable to form multi beams with a single semiconductor laser array, instead of using the plurality of semiconductor laser arrays.

Figure 13:
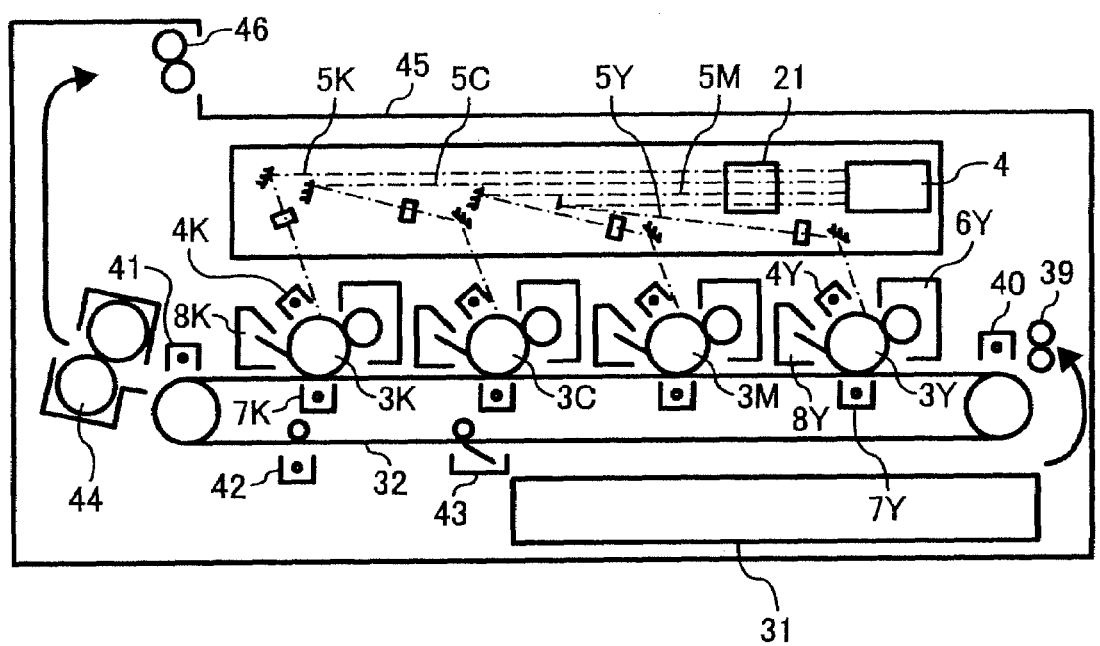
FIG. 13 is a side view of an image forming apparatus to which the optical scanning device according to the present invention is applied.

FIG. 13 is a side view of an image forming apparatus to which the optical scanning device according to the present invention is applied. In a sixth embodiment of the invention, the optical scanning device according to the present invention is applied to a tandem full-color laser printer. As shown in FIG. 13, provided on the bottom side within the apparatus is a conveyer belt 32 that carries a transfer paper (not shown) supplied from a paper supplying cassette 31 disposed in a horizontal direction. The photosensitive member 3Y for yellow Y, the photosensitive member 3M for magenta M, and a photosensitive member 3C for cyan C, and the photosensitive member 3K for black K are disposed on the conveyer belt 32 at regular intervals, sequentially from the upstream side of the conveyance direction of the transfer paper. In the following description, the letters Y, M, C, and K are used together with the reference numerals to distinguish the constituent elements for the different colors. The photosensitive members 3Y, 3M, 3C, and 3K are all configured to have a diameter equal to one another. Processing members that performs the processes in the electronic photograph process are provided around each of the photosensitive members. For example, provided around the photosensitive member 3Y sequentially are an electric charger 4Y, an scanning optical system 5Y, a developing device 6Y, a transfer charger 7Y, a cleaning device 8Y. The other photosensitive members, namely 3M, 3C, and 3K are also configured in the same manner. To be more specific, according to the sixth embodiment, the surfaces of the photosensitive members 3Y, 3M, 3C, and 3K serve as scanning surfaces or irradiated surfaces corresponding to the different colors, respectively. The scanning optical systems 5Y, 5M, SC, and 5K are provided in one-to-one correspondence with the photosensitive members. A scanning lens L1 is used in common between M and Y, and in common between K and C. Also provided around the conveyer belt 32 are a resist roller 39 and a belt electric charger 40 that are positioned on the upstream side with respect to the photosensitive member 5Y, and also a belt separation charger 41, an electricity removing charger 42, a cleaning device 43, and the like that are sequentially positioned on the downstream side of the rolling direction of the conveyer belt 32 with respect to the photosensitive member 5K. Provided on the downstream side, with respect to the belt separation charger 41, of the conveyance direction of the transfer paper is a fixation device 44, which is linked to a paper ejecting tray 45 via a paper ejecting roller 46.

With this configuration schematically outlined, for example, when a full-color mode (a mode with a plurality of colors) is used, light beams are optically scanned onto the photosensitive members 3Y, 3M, 3C, and 3K by the optical scanning devices 5Y, 5M, 5C, and 5K based on image signals corresponding to the different colors of Y, M, C, and K, so that electrostatic latent images corresponding to the color signals are formed on the surfaces of the photosensitive members. Each of these electrostatic latent images is developed into a toner image by a corresponding one of the developing devices, using a color toner. The toner images are sequentially transferred onto the transfer paper that is electrostatically adhered to the conveyer belt 32 and carried over, so as to be overlapped on top of one another. Consequently, a full-color image is formed on the transfer paper. The full-color image is fixed by the fixation device 44, and the paper is ejected onto the paper ejection tray 45 by the paper ejection roller 46.

When the optical scanning device described in the exemplary embodiments is used as each of the scanning optical systems 5Y, 5M, 5C, and 5K included in the image forming apparatus, it is possible to effectively correct the bendings of the scanning lines and the degradation of the wave aberration. Thus, it is possible to achieve an image forming apparatus that exhibits no color registration errors and assures a high level of image reproduction performance.

The image forming apparatus shown in FIG. 13 includes the optical scanning devices that use the one-side scanning method; however, it is possible to structure an image forming apparatus that is capable of performing a similar tandem color image formation process with optical scanning devices that use the opposite scanning method as shown in FIG. 8.

According to an embodiment of the present invention, it is possible to effectively correct the bendings of the scanning lines caused by the oblique incident and the bendings of the scanning lines caused by a change in the temperature. When the optical scanning device of the present invention is applied to an image forming apparatus for color images, it is possible to effectively correct color registration errors and to achieve color images in high quality.

Furthermore, according to an embodiment of the present invention, it is possible to achieve an environmentally friendly optical scanning device that allows the size of the optical deflector smaller and makes it possible to reduce electric power consumption through a reduction of the number of rotations of a rotating polygon mirror that serves as a multi-beam optical deflector. Also, it is possible to achieve an image forming apparatus that includes such an optical scanning device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
    a light source unit that emits a plurality of light beams;
    an optical deflector that deflects the light beams from the light source unit; and
    a scanning optical system that focuses the deflected light beams on different surfaces to be scanned, respectively, wherein
    each of the light beams is incident on a deflecting reflection surface of the optical deflector obliquely in a sub-scanning direction with respect to a line normal to the deflecting reflection surface,
    light beams that are deflected at a same deflecting reflection surface of the optical deflector are incident on the scanning optical system from both sides with respect to the line normal to the deflecting reflection surface in the sub-scanning direction,
    an even number of reflection mirrors reflecting the light beam in the sub-scanning direction are disposed on an optical path, from the deflecting reflection surface to a corresponding surface to be scanned, of a light beam having a largest incident angle that is incident on the deflecting reflection surface from one side of the line normal to the deflecting reflection surface in the sub-scanning direction, and
    an odd number of reflection mirrors reflecting the light beam in the sub-scanning direction are disposed on an optical path, from the deflecting reflection surface to a corresponding surface to be scanned, of a light beam having a largest incident angle that is incident on the deflecting reflection surface from an other side of the line normal to the deflecting reflection surface in the sub-scanning direction.

2. The optical scanning device according to claim 1, wherein all of the light beams emitted from the light source unit are deflected at the same deflecting reflection surface of a same optical deflector.

3. The optical scanning device according to claim 1, wherein
    a plurality of pairs of light beams is incident on the scanning optical system from both sides with respect to the line normal to the deflecting reflection surface in the sub-scanning direction, and
    each of the pairs of light beams is incident on a different deflecting reflection surface of a same optical deflector.

4. An optical scanning device, comprising:
    a light source unit that emits a plurality of light beams;
    an optical deflector that deflects the light beams from the light source unit; and
    a scanning optical system that focuses the deflected light beams on different surfaces to be scanned, respectively, wherein
    each of the light beams is incident on a deflecting reflection surface of the optical deflector obliquely in a sub-scanning direction with respect to a line normal to the deflecting reflection surface,
    light beams that are deflected at a same deflecting reflection surface of the optical deflector are incident on the scanning optical system from both sides with respect to the line normal to the deflecting reflection surface in the sub-scanning direction,
    an odd number of reflection mirrors reflecting the light beam in the sub-scanning direction are disposed on an optical path, from the deflecting reflection surface to a corresponding surface to be scanned, of a light beam having a largest incident angle that is incident on the deflecting reflection surface from one side of the line normal to the deflecting reflection surface in the sub-scanning direction, and
    an even number of reflection mirrors reflecting the light beam in the sub-scanning direction are disposed on an optical path, from the deflecting reflection surface to a corresponding surface to be scanned, of a light beam having a largest incident angle that is incident on the deflecting reflection surface from an other side of the line normal to the deflecting reflection surface in the sub-scanning direction.

5. The optical scanning device according to claim 4, wherein all of the light beams emitted from the light source unit are deflected at the same deflecting reflection surface of a same optical deflector.

6. The optical scanning device according to claim 4, wherein
a plurality of pairs of light beams is incident on the scanning optical system from both sides with respect to the line normal to the deflecting reflection surface in the sub-scanning direction, and
each of the pairs of light beams is incident on a different deflecting reflection surface of a same optical deflector.

7. An image forming apparatus having the optical scanning device according to claim 1.

8. An image forming apparatus having the optical scanning device according to claim 2.

* * * * *